United States Patent
Dong et al.

(10) Patent No.: US 11,696,248 B2
(45) Date of Patent: *Jul. 4, 2023

(54) SERVICE LAYER REGISTRATION

(71) Applicant: Convida Wireless, LLC, Wilmington, DE (US)

(72) Inventors: Lijun Dong, San Diego, CA (US); Rocco Di Girolamo, Quebec (CA); Chonggang Wang, Princeton, NJ (US); Hongkun Li, Malvern, PA (US); Qing Li, Princeton Junction, NJ (US); Catalina Mihaela Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/191,789

(22) Filed: Mar. 4, 2021

(65) Prior Publication Data
US 2021/0195548 A1    Jun. 24, 2021

Related U.S. Application Data

(63) Continuation of application No. 16/848,882, filed on Apr. 15, 2020, now Pat. No. 10,972,995, which is a
(Continued)

(51) Int. Cl.
*H04W 60/00* (2009.01)
*G07B 15/06* (2011.01)
(Continued)

(52) U.S. Cl.
CPC ........ *H04W 60/005* (2013.01); *G07B 15/063* (2013.01); *H04L 12/6418* (2013.01);
(Continued)

(58) Field of Classification Search
CPC ..... H04W 60/005; H04W 4/70; H04W 48/02; H04W 48/16; H04L 12/6418; H04L 67/146; H04L 67/51; H04L 4/70; G07B 15/063
See application file for complete search history.

(56) References Cited

U.S. PATENT DOCUMENTS

| 7,167,904 B1 | 1/2007 | Devarajan et al. |
| 9,025,445 B2 | 5/2015 | Jain et al. |

(Continued)

FOREIGN PATENT DOCUMENTS

| CN | 101876902 A | 11/2010 |
| CN | 103039053 A | 4/2013 |

(Continued)

OTHER PUBLICATIONS

Bhalla et al., "This document specifies the functional architecture for the oneM2M Services Platform. This version of the document is an update over TS-0001-V1.6.1 and incorporates maintenance contributions agreed during ARC#15.2 conference call", vol. WG2—Architecture, ARC, Mar. 12, 2015, pp. 1-321.
(Continued)

*Primary Examiner* — Min Jung
(74) *Attorney, Agent, or Firm* — BakerHostetler

(57) ABSTRACT

A service layer entity may register to another service layer entity and proactively request to gain access to the local services hosted by the registrar entity. A registrar entity may accept a registree entity's registration request but only grant access of its partial services to the registree entity. If a registree entity does not need to proactively request the services within its registration request message, the registrar entity decides what services may be needed by the registree entity and grants access of those services to the registree entity.

20 Claims, 20 Drawing Sheets

Related U.S. Application Data continuation of application No. 15/754,827, filed as application No. PCT/US2016/049838 on Sep. 1, 2016, now Pat. No. 10,667,229.

(60) Provisional application No. 62/212,903, filed on Sep. 1, 2015.

(51) Int. Cl.
| | | |
|---|---|---|
| *H04W 48/02* | (2009.01) | |
| *H04W 4/70* | (2018.01) | |
| *H04L 12/64* | (2006.01) | |
| *H04L 67/51* | (2022.01) | |
| *H04L 67/146* | (2022.01) | |
| *H04W 48/16* | (2009.01) | |
| *H04W 4/80* | (2018.01) | |
| *H04W 8/18* | (2009.01) | |
| *H04L 67/12* | (2022.01) | |

(52) U.S. Cl.
CPC .......... *H04L 67/146* (2013.01); *H04L 67/51* (2022.05); *H04W 4/70* (2018.02); *H04W 48/02* (2013.01); *H04W 48/16* (2013.01); *H04L 67/12* (2013.01); *H04W 4/80* (2018.02); *H04W 8/18* (2013.01)

(56) References Cited

U.S. PATENT DOCUMENTS

| | | |
|---|---|---|
| 9,930,632 B2 | 3/2018 | Wu |
| 10,171,286 B2 | 1/2019 | Seed et al. |
| 10,667,229 B2 | 5/2020 | Dong et al. |
| 2009/0080411 A1 | 3/2009 | Lyman |
| 2012/0317254 A1 | 12/2012 | Chekhanovskiy et al. |
| 2013/0188515 A1 | 7/2013 | Pinheiro et al. |
| 2015/0033311 A1 | 1/2015 | Seed et al. |
| 2015/0341825 A1 | 11/2015 | Soriaga et al. |
| 2016/0198284 A1 | 7/2016 | Bhalla |
| 2016/0227371 A1 | 8/2016 | Wang et al. |
| 2016/0358143 A1* | 12/2016 | Foti ...................... G06Q 20/389 |
| 2017/0063931 A1 | 3/2017 | Seed et al. |
| 2017/0099562 A1 | 4/2017 | Bhalla |
| 2017/0272894 A1 | 9/2017 | Wang et al. |
| 2017/0311114 A1* | 10/2017 | Yang .................... H04W 76/10 |
| 2017/0337088 A1* | 11/2017 | Wang ...................... G06F 9/541 |
| 2018/0199175 A1* | 7/2018 | Wu ........................ H04W 64/00 |
| 2018/0373772 A1 | 12/2018 | Kim et al. |
| 2021/0191736 A1* | 6/2021 | Starsinic ............... G06F 21/445 |

FOREIGN PATENT DOCUMENTS

| | | |
|---|---|---|
| CN | 103782611 A | 5/2014 |
| WO | 2011/112683 A1 | 9/2011 |
| WO | 2015/034337 A1 | 3/2015 |
| WO | 2015/056008 A1 | 4/2015 |
| WO | 2015/108379 A1 | 7/2015 |

OTHER PUBLICATIONS

IEEE "Power Line Communications Standards Committee", IEEE Standard for a Convergent Digital Home Network for Heterogeneous Technologies, Apr. 12, 2013, pp. 1-20.

OneM2M Technical Specification TS-0001 V2.3.0 "Functional Architecture", Aug. 7, 2015, 352 pages.

Van Pelt, "Rich Communication Suite 5.1 Advanced Communications, Services and Client Specification, Version 1.0", GSMA, Aug. 13, 2012, 2 pages.

* cited by examiner

SERVICE LAYER REGISTRATION

CROSS-REFERENCE TO RELATED APPLICATIONS

This application is a continuation of U.S. application Ser. No. 16/848,882 filed Apr. 15, 2020 which is a continuation of U.S. application Ser. No. 15/754,827 filed Feb. 23, 2018 which is a National Stage Application filed under 35 U.S.C. § 371 of International Application No. PCT/US2016/049838 filed Sep. 1, 2016, which claims the benefit of U.S. Provisional Application No. 62/212,903, filed on Sep. 1, 2015 entitled "Service Layer Registration," the contents of which are hereby incorporated by reference herein.

BACKGROUND oneM2M Architecture

The oneM2M standard (as provided in oneM2M-TS-0001 oneM2M Functional Architecture-V-2.1.0, which is incorporated by reference in its entirety) under development defines a Service Layer called "Common Service Entity (CSE)." FIG. 1 illustrates an exemplary oneM2M architecture that defines a service layer. The Service Layer provides "horizontal" services that can be utilized by different "vertical" machine-to-machine (M2M) systems and applications, such as e-Health, fleet management, and smart homes. Mca reference point 111 interfaces with application entity (AE) 112. Mcc reference point 113 interfaces with another CSE 115 within the same service provider domain and Mcc' reference point 116 interfaces with another CSE (not shown) in a different service provider domain 117. Mcn reference point 118 interfaces with the underlying network service entity (NSE) 119. NSE 119 provides underlying network services to the CSEs, such as device management, location services and device triggering. CSE contains multiple logical functions called "Common Service Functions (CSFs)", such as "Discovery" or "Data Management & Repository."

Within the oneM2M RESTful architecture, (also known as resource oriented Architecture or RoA) the CSE supports the instantiation of a set of common service functions (CSFs), as shown in FIG. 2. CSF functionality is implemented via resources which are uniquely addressable entities having a representation that can be manipulated via RESTful methods such as Create, Retrieve, Update, and Delete. These resources are addressable using universal resource identifiers (URIs). A resource supports a set of attributes that store relevant information about the resource and may contain references to other resources termed child resources(s). A child resource is a resource that has a containment relationship with a parent resource and whose lifetime is limited by the resource lifetime of the parent From a deployment perspective, FIG. 3 depicts configurations supported by the oneM2M architecture. oneM2M architecture enables the application service node (ASN), application dedicated node (ADN), the middle node (MN), and the infrastructure node (IN). The ASN is a node that contains one CSE and contains at least one AE. An example of physical mapping is an ASN residing in an M2M Device. The ADN is a node that contains at least one AE and does not contain a CSE. An example of physical mapping is an ADN residing in a constrained M2M Device. An MN is a node that contains one CSE and contains zero or more AEs. An example of physical mapping for an MN is an MN residing in an M2M Gateway. The IN is a node that contains one CSE and contains zero or more AEs. An example of physical mapping for an IN is the IN residing in an M2M Service Infrastructure. There also may be a non-oneM2M node, which is a node that does not contain oneM2M Entities (neither AEs nor CSEs). Such nodes represent devices attached to the oneM2M system for interworking purposes, including management.

Registration

Conventionally, an AE on an ASN, an MN, or an IN performs registration locally with the corresponding CSE in order to use M2M services offered by that CSE. An AE on an ADN performs registration with the CSE on an MN or an IN in order to use M2M services offered by that CSE. An IN-AE performs registration with the corresponding CSE on an IN in order to use M2M services offered by that IN CSE.

The CSE on an ASN performs registration with the CSE in the MN in order to be able to use M2M services offered by the CSE in the MN. As a result of successful ASN-CSE registration with the MN-CSE, the CSEs on the ASN and the MN establish a relationship allowing them to exchange information.

The CSE on an MN performs registration with the CSE of another MN in order to be able to use M2M Services offered by the CSE in the other MN. As a result of successful MN-CSE registration with the other MN-CSE, the CSEs on the MNs establish a relationship allowing them to exchange information.

The CSE on an ASN or on an MN perform registration with the CSE in the IN in order to be able to use M2M Services offered by the CSE in the IN. As a result of successful ASN/MN registration with the IN-CSE, the CSEs on ASN/MN and IN establish a relationship allowing them to exchange information.

In the above described cases, the AE or CSE performing the registration is referred to as a Registree AE or Registree CSE. The CSE on which the AE or CSE is registering is referred to as the Registrar CSE.

Following a successful registration of an AE to a CSE, the AE is able to access, assuming access privilege is granted, the resources in all the CSEs that are potential targets of request from the Registrar CSE.

The followings are some conventional registration regulations:

An AE shall not be registered to more than one CSE (ASN-CSE, MN-CSE or IN-CSE).
 An ASN-CSE shall be able to be registered to at most one other CSE (MN-CSE or IN-CSE).
 An MN-CSE shall be able to be registered to at most one other CSE (MN-CSE or IN-CSE).
 A concatenation (registration chain) of multiple uni-directional registrations shall not form a loop. E.g. two MN-CSEs A and B, cannot register with each other. Three MN-CSEs A, B and C, where A registers to B, and B registers to C, then C cannot register to A.

Conventionally the CSE registration procedure requires the creation of two resources (a <remoteCSE> on the Receiver CSE and a <remoteCSE> on the Originator CSE). The Originator shall be the registree CSE. The Receiver shall be the registrar CSE creating the <remoteCSE> resource initially. FIG. 4 illustrates an exemplary procedure for creating a <remoteCSE> resource. At step 131, originator 121 sends the CREATE Request message. At step 132, receiver 121 processes the registration request message. At step 133, receiver 121 responds with a registration response message that contains the address/URI of the registered CSE. At step 134, originator, upon receipt of the CREATE response message, creates a <remoteCSE> resource locally under its <CSEBase> resource. This resource is representing receiver 121 CSE. Originator 120 provides the appropriate values to all mandatory parameters. At step 135, originator 120 may issue a RETRIEVE Request towards the receiver (same To as for the CREATE request message) to obtain the optional parameters of the <remoteCSE> resource created at receiver 121 as for step 134 (e.g. labels, accessControlPolicyIDs attributes). At step 136, receiver 121 verifies that originator 120 has the appropriate privileges to access the information. At step 137, receiver 121 sends a RETRIEVE response message. At step 138, originator 120 updates the created <remoteCSE> resource for receiver 121 with the information obtained in step 137.

Conventionally, the procedure for AE registration follows the message flow description as depicted in FIG. 5. The Originator is the Registree AE. The receiver (Registrar CSE) allows the creation of the <AE> resource according to the access control policy and information in the applicable subscription profile. The receiver derives the applicable M2M-Service-Profile-ID from the CSE-ID of the Registrar CSE. Note that in FIG. 5, some of the information has been truncated, but may be found in oneM2M-TS-0001 oneM2M Functional Architecture-V-2.1.0.

With reference to FIG. 5, at step 141, if the Registree AE 123 intends to use a security association to perform the registration, a security association establishment procedure is carried out first. At step 142, Registree AE 123 sends the information for the registration CREATE procedure with the following specific information in the CREATE Request message:

From: AE-ID-Stem or NULL.
In case the Registree AE 123 has already registered successfully before, then deregistered and intends to register again with the same AE-ID-Stem value as before, the Registree AE 123 shall include that AE-ID-Stem value into the From parameter.
In case the Registree AE 123 has not registered successfully before and intends to get an M2M-SP-assigned AE-ID-Stem starting with an 'S' character assigned to itself but it does not have any specific value to suggest, it shall set the From parameter to the character 'S'.
In case the Registree AE 123 intends to initiate a fresh registration and has no preference for the AE-ID-Stem value, the From parameter shall be set to NULL.

At step 143, the Receiver (e.g., Registrar CSE 124) shall determine whether the request to register the Registree AE 123 meets any of the following conditions. There is a check if the applicable service subscription profile lists a combination of (allowed AE-ID-Stem value and allowed App-ID value) for the Credential-ID and the Registrar CSE-ID that match with the App-ID attribute in the Content parameter of the request and the AE-ID-Stem in the From parameter of the request. The applicable rules for this checking are contained in the <serviceSubscribedAppRule> resource(s) which are linked to by the ruleLinks attribute of the <m2mServiceSubscribedNode> resource(s) associated with the Registrar CSE. At step 144, if the From parameter of the request provides an AE-ID-Stem value, the Registrar CSE checks whether an <AE> resource with an Unstructured-CSE-relative-Resource-ID identical to the AE-ID-Stem value provided in the From parameter of the request does already exist. If so, there is still an active registration using the same AE-ID-Stem on the Registrar CSE and the Registrar CSE shall respond with an error.

With continued reference to FIG. 5, the procedure continues with one for the following cases a)-d), details can be found in oneM2M-TS-0001 oneM2M Functional Architecture-V-2.1.0, which all end in a response of step 149:

Case a) AE-ID-Stem starts with 'S' and AE does not include an AE-ID-Stem (initial registration)—Steps 145a through 148a.
Case b) AE-ID-Stem starts with 'S' and AE includes an AE-ID-Stem (re-registration)—Steps 145b through 148b
Case c) AE-ID-Stem starts with 'C' and AE does not include an AE-ID-Stem (initial registration)—Step 145c
Case d) AE-ID-Stem starts with 'C' and AE includes an AE-ID-Stem (re-registration)—Step 145d Resource Type m2mServiceSubscriptionProfile Conventionally, the <m2mServiceSubscriptionProfile> resource represents an M2M Service Subscription. It is used to represent all data pertaining to the M2M Service Subscription, i.e. the technical part of the contract between an M2M Application Service Provider and an M2M Service Provider. The serviceRoles attribute of the <m2mServiceSubscriptionProfile> resource contains a list of Service Role IDs (S-RoleID) that are subscribed to in this service subscription.

Service Orchestration Profile

Conventionally, the role of Service Orchestration Profiles is to provide a mechanism for the exchange of service related attributes (i.e. metadata) that can be used for service orchestration as well as other functions such as service discovery. The following attributes are some examples of the Service Orchestration Profile. A profile identifier specifies an identifier of a profile. Profile Semantics specifies a semantic description or an address/link to a semantic description that describes service orchestration attributes contained within the profile. Profile Type specifies the type of profile. Service Orchestration Targets specifies an optional list of targets that service orchestration is to be performed upon (e.g. a service nodes, service layer, or service capability instance). Service Orchestration Schedule specifies scheduling information for when service orchestration is to be performed and/or duration of time for which profile is valid. Service Orchestration Policies specifies policies to qualify performing service orchestration. Service Orchestration Context specifies context information that is applicable to service orchestration. Desired Services specifies the service configuration that an orchestration client is requesting to be orchestrated onto a specified target(s). Supported Services specifies the set of supported services that an orchestration target supports.

Service Layer Message Routing Service

The Message Routing Service is a service that allows a CSE to route and forward messages from its registree AE or CSE (the message may originate from the registree AE or CSE, or the message may be forwarded by the registree CSE) to the target. In general, the Message Routing Service is a service that a registrar entity may provide to a registree entity, and vice versa. The Message Routing Service may be considered as a special service, because by default, the Message Routing Service is mutual and bidirectional. It means that when a registrar entity grants access permission of this Message Routing Service to its registree entity, the registree entity automatically provides the Message Routing Service for the registrar entity as well. Note, this is the default setting of the Message Routing Service, however, the service can be set up as uni-directional. Each of the local services hosted by a SL entity shall have an identifier that is unique among all local services.

SUMMARY

Conventionally, when registering with one CSE, there may be a corresponding reservation of all resources (which may not be necessary) on the one CSE. It may be beneficial to only reserve resources for the services that will be needed. This may help regulate use within any restrictions with regard to capacity (e.g., number of devices/AEs) that are connected with a CSE.

Disclosed herein is a flexible service layer registration, which has the following properties. A SL entity (e.g., AE, CSE in oneM2M, also referred to as registree entity) may register to a SL entity (e.g., CSE in oneM2M, also referred to as a registrar entity) and proactively request to gain access to the local services hosted by the registrar entity. A registrar entity may accept a registree entity's registration request but only grant access of its partial services to the registree entity. If a registree entity does not need to proactively request the services within its registration request message, the registrar entity decides what services may be needed by the registree entity and grants access of those services to the registree entity.

A registree entity may register to more than one registrar entity. For example, if one registrar entity does not grant access of the requested service to the registree entity, it can register to another entity for the same service. A concatenation (registration chain) of multiple uni-directional registrations may form a loop.

Disclosed herein is a oneM2M example with remoteCSE resource enhancement as well as new resources. The example provides methods of managing the local services of a CSE, as well as the granted services, rejected services, and pending services of a registered AE and CSE.

BRIEF DESCRIPTION OF THE DRAWINGS

A more detailed understanding may be had from the following description, given by way of example in conjunction with the accompanying drawings wherein.

DETAILED DESCRIPTION

Conventional service layer registration only allows a registree register to one and only one registrar. For example, an AE registers to only one CSE, a CSE registers to only one CSE as well. Therefore an AE or a CSE is only able to use the services on the single registered CSE.

Currently, the registration relationship allows a registree to use all the services provided by the registrar by default with proper access rights. However, it is the registree may only want to use part of the services provided by the registrar, or the registrar may only want to provide part of its services to a registree.

Conventionally, the subscription profile of a registree AE can be set up based on the technical part of the contract between an AE and an M2M Service Provider. The associated serviceRoles attribute can be used to control the services and resources that could be accessed by the registree AE. However, the conventional mechanisms provided with oneM2M-TS-0001 oneM2M Functional Architecture-V-2.1.0 have the following issues. A first issue is that the service profile is only applicable to a registree AE, not CSE. A second issue is that the service profile only considers the services that are associated with currently defined resources, thus it is not generic enough in managing the accessibility of all the local services (e.g., message forwarding service) provided by the CSE. A third issue is that the subscription profile is contract based (i.e., pre-configured and static), therefore a registree AE or CSE is not allowed to flexibly request for services provided by the registrar CSE during the registration process. A fourth issue is that all the subscription profiles are managed by the IN-CSE, while the MN-CSEs do not have the independence in deciding the users of its own services. A fifth issue is that each CSE has no intelligence in making the decision for the registree AE or CSE on what services may be needed by it.

Thus, the conventional service layer registration lacks the capabilities to allow a registree to flexibly request services from a registrar during the registration process, and allow a registrar to selectively grant permission to a registree to use some of its services. Disclosed herein are methods that allow for a registree to register with multiple CSEs. In an example, a CSE may use the service layer message routing service provided by multiple transit CSEs.

Figure 1:
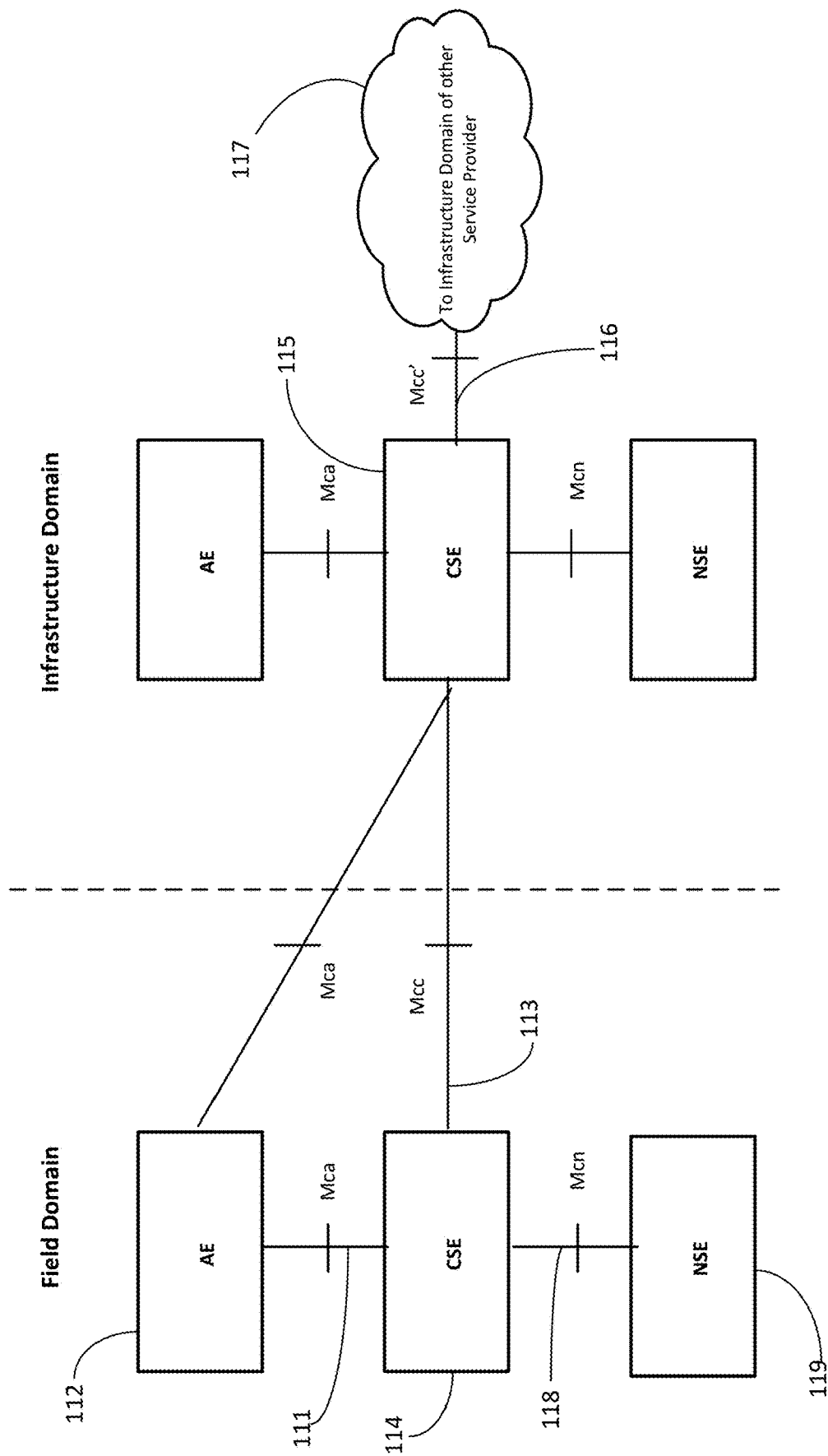
FIG. 1 illustrates an exemplary oneM2M Architecture.
Figure 2:
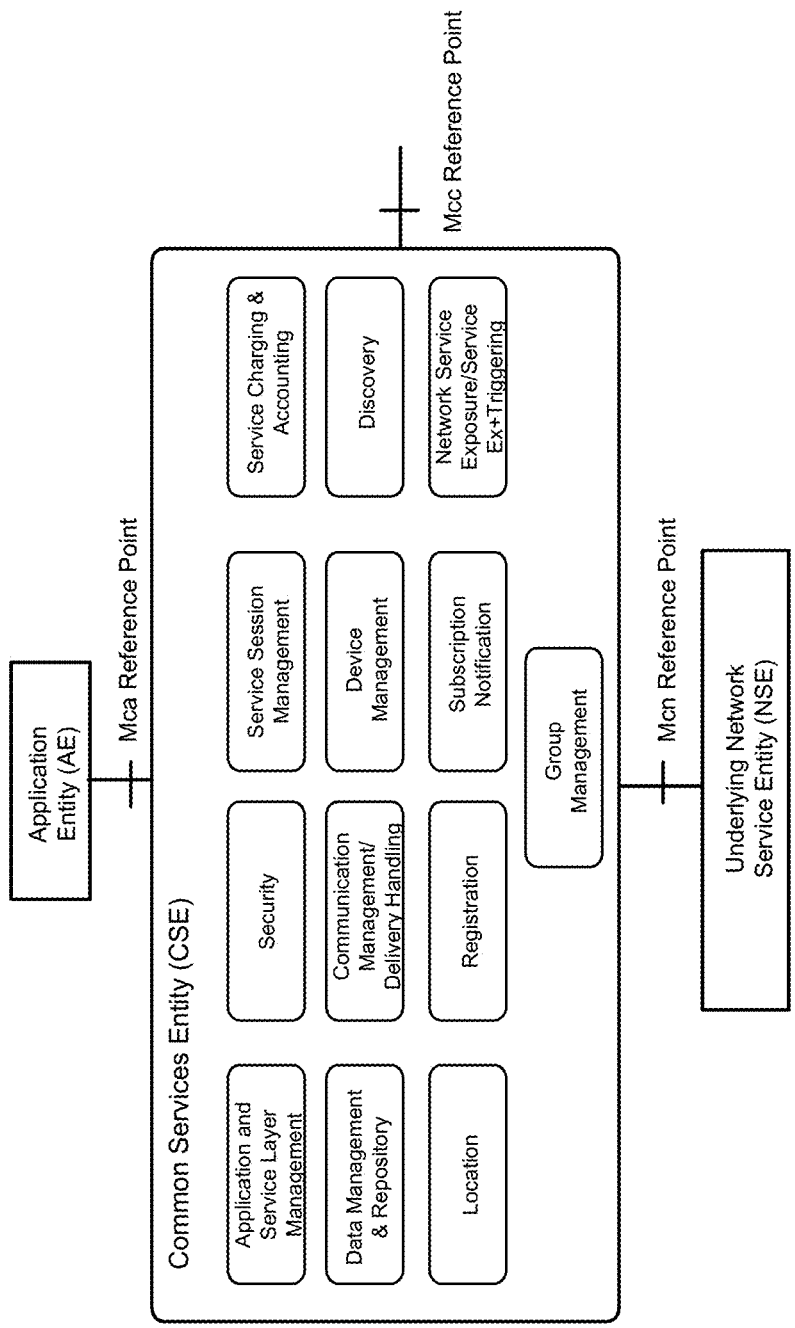
FIG. 2 illustrates exemplary oneM2M Common Service Functions.
Figure 3:
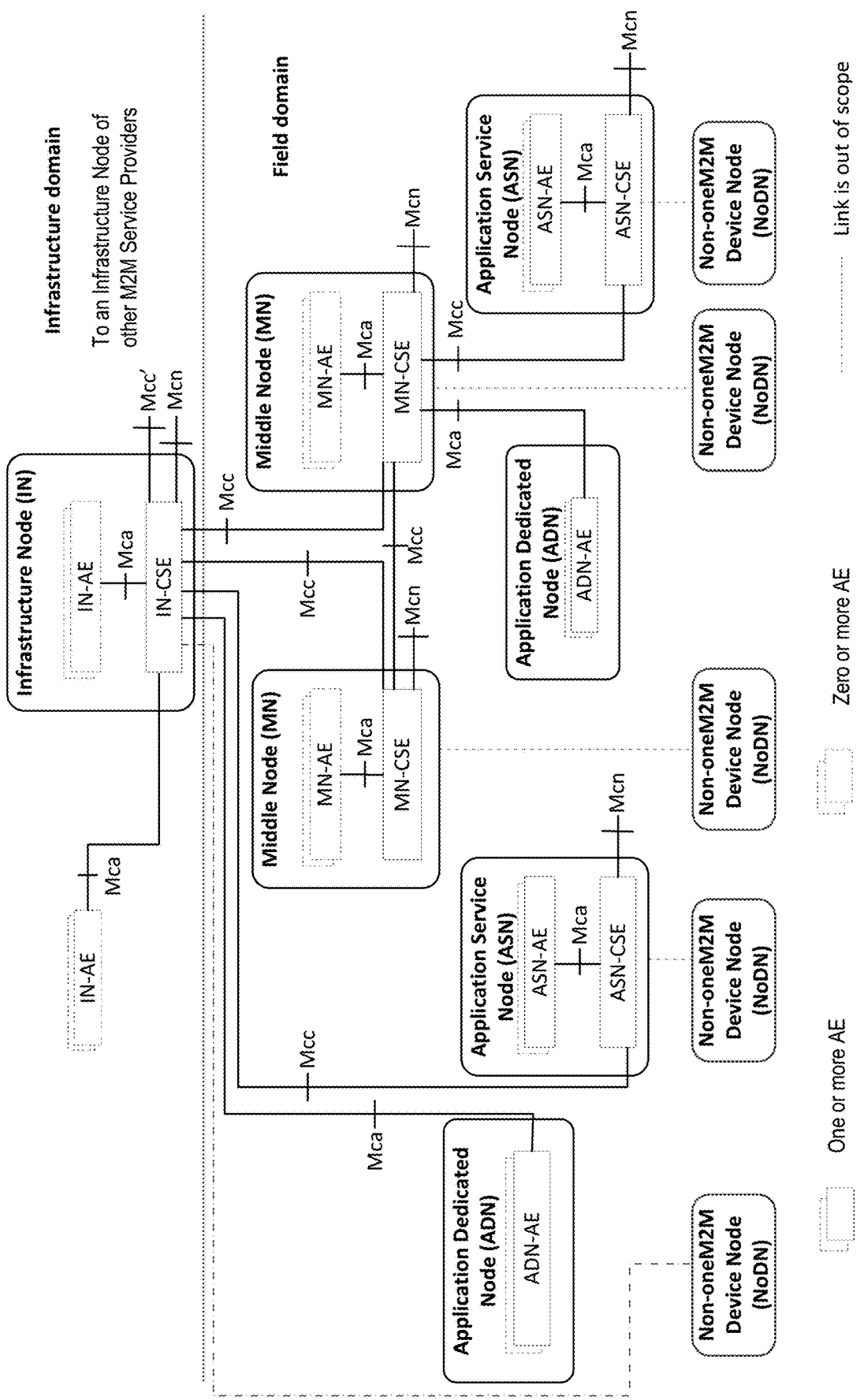
FIG. 3 illustrates exemplary configurations supported by oneM2M architecture.
Figure 4:
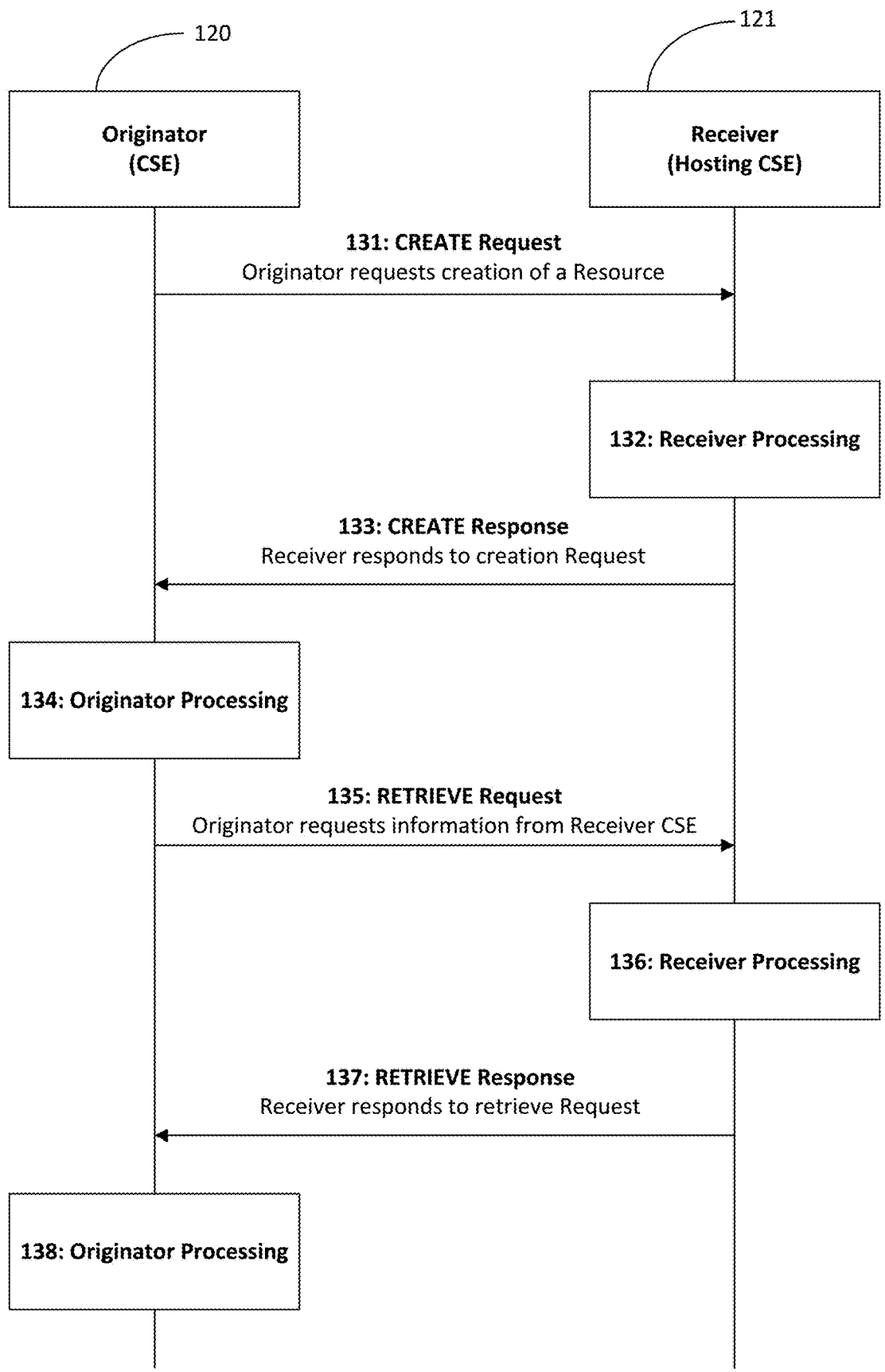
FIG. 4 illustrates an exemplary procedure for creating a <remoteCSE> resource.
Figure 5:
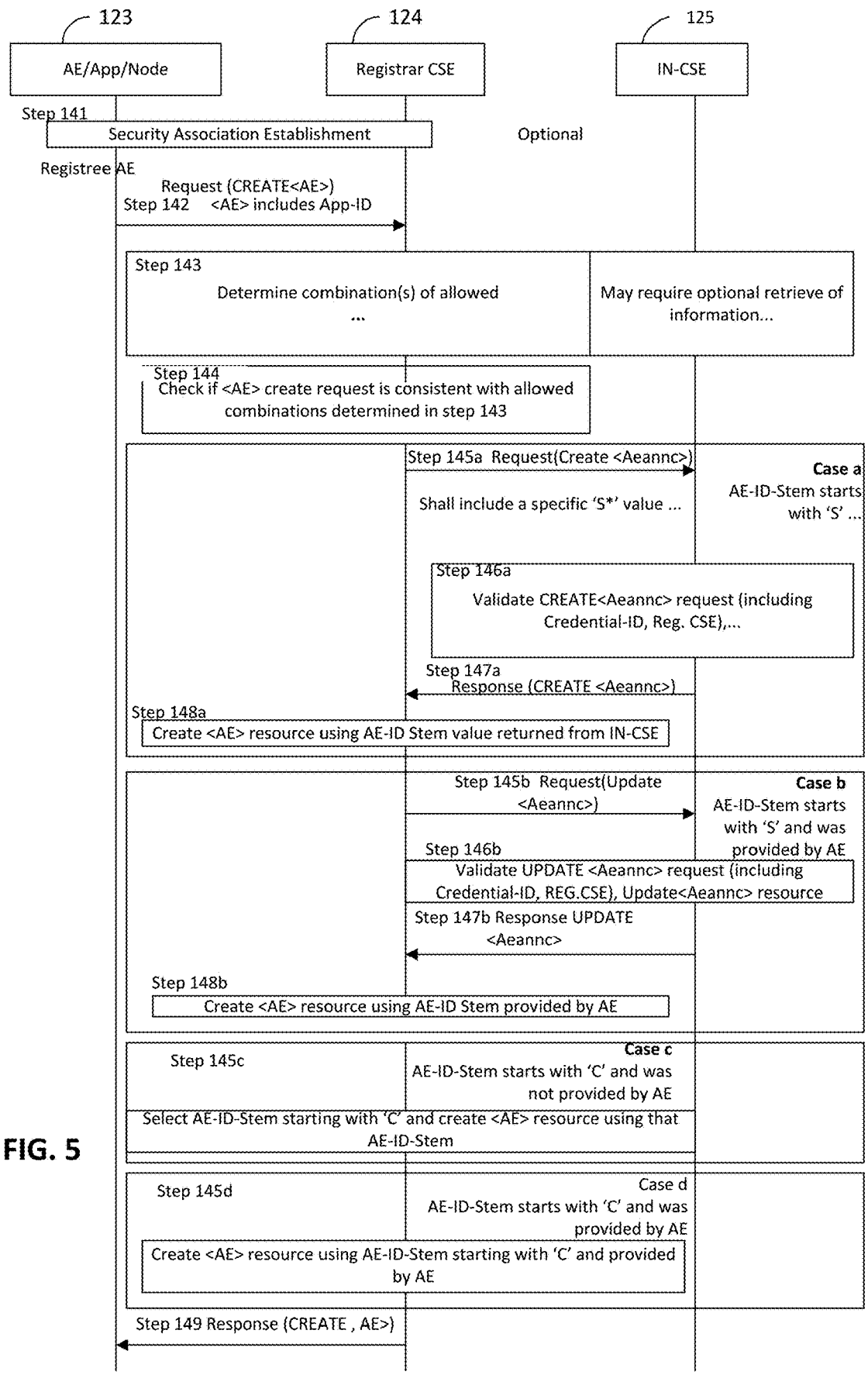
FIG. 5 illustrates an exemplary procedure for creating an <AE> resource.
Figure 6:
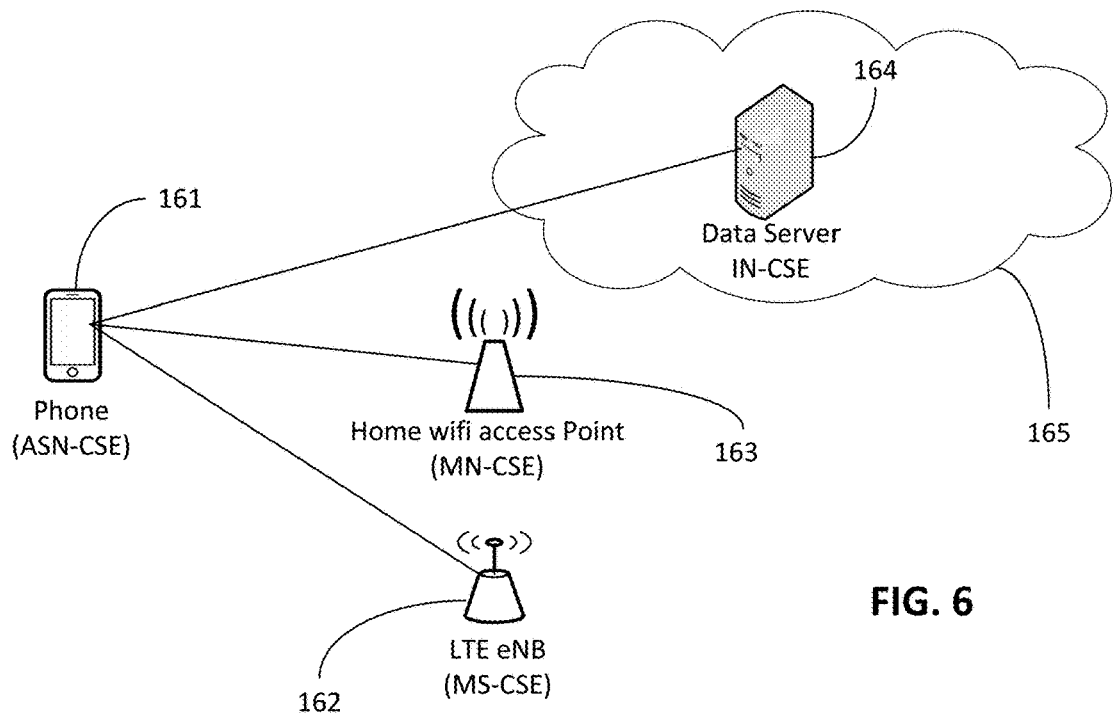
FIG. 6 illustrates an exemplary use case service layer registration.

FIG. 6 illustrates a first exemplary environment for the use of multiple service layer entities where a phone (e.g., phone/ASN-CSE 161) may connect with multiple other service layer (SL) entities. In FIG. 6, there are multiple SL entities, such as home Wi-Fi access point 163 (MN-CSE), LTE eNB 162 (MN-CSE), and data server 164 (IN-CSE). Phone 161 may be within the coverage area of Wi-Fi access point 163 or LTE eNB 162. Phone SL 161 may be communicatively connected with data server 164 via Cloud 165 (e.g., Amazon® Cloud or Facebook®). Phone 161 may register with Wi-Fi access point 163 for Communication Management and Delivery Handling Service due to the low cost. Phone 161 may also register with LTE eNB 162 for certain services, for example, Communication Management and Delivery Handling when there is no other cheaper Internet access, Security Service and Location Service because the cellular network provides good authentication mechanisms and location information etc. Phone SL 161 may have many applications running on it, as well as integrated sensors. The SL in data server 164 hosted in cloud 165 may manage and store the data related to nature (temperature, humidity, noise, etc.), data related to social life (social applications, advertisement, etc.), or the like. The SL of phone 161 registers to the SL in data server 164 hosted in the cloud 165 for the services, such as Data Management and Repository, Subscription and Notification, Location, Discovery etc. for different types of data and applications.

Discussed below is an exemplary scenario for the use of multiple SL entities in the context of FIG. 6. Phone 161 may be used to turn on a coffee machine for coffee in the morning. Phone 161 may use a device management service provided by Wi-Fi access point 163 and also use a security service provided by LTE eNB 162 for authentication. Lastly, phone 161 may use a data management service and subscription service provided by data server 164 to receive a notification that the coffee is ready.

Figure 7:
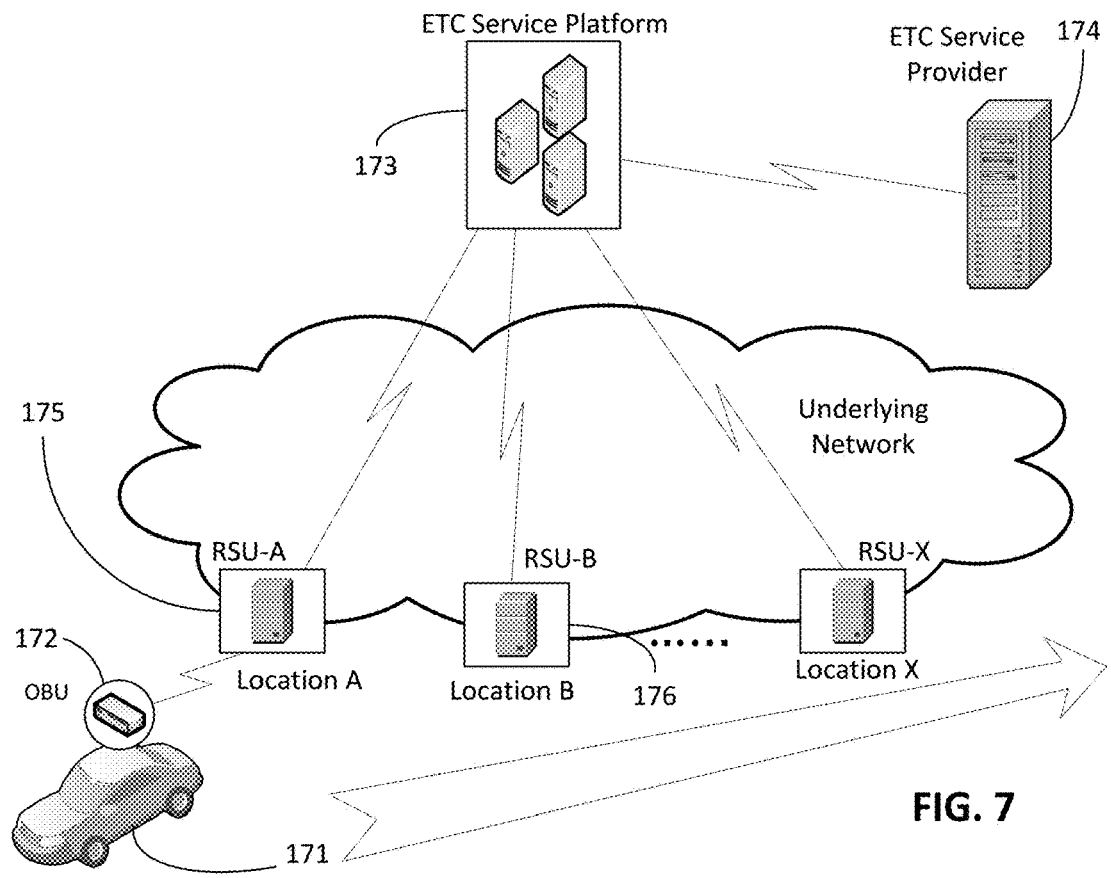
FIG. 7 illustrates an exemplary use case service layer registration.

FIG. 7 illustrates a first exemplary environment for the use of multiple service layer entities where an onboard unit may connect with multiple SL entities. Electronic toll collection (ETC) is a part of an Intelligent Transportation System. ETC helps to reduce the delay on toll roads by collecting tolls electronically. ETC systems determine whether vehicles passing are enrolled in the program, alerts enforcers for those that are not, and electronically debits the accounts of registered vehicle owners without requiring them to stop. On board unit (OBU) 171 is a device located in vehicle 171 that may be communicatively connected with ETC service platform 173 or ETC service provider 174 via roadside CSE 175 or roadside CSE 176. OBU 171 may register with ETC service provider 174 for providing the ETC services, e.g. authorizing the OBU 172 of vehicle 171, or debiting the associated account of OBU 172 of vehicle 171 to pay the toll, etc. OBU 172 may register with local roadside CSE 175 and roadside CSE 176 to provide communication services. OBU 172 may also register with roadside CSE 175 and roadside CSE 176 at the same time as the vehicle moves out of the coverage of one CSE into the coverage of another CSE.

Figure 8:
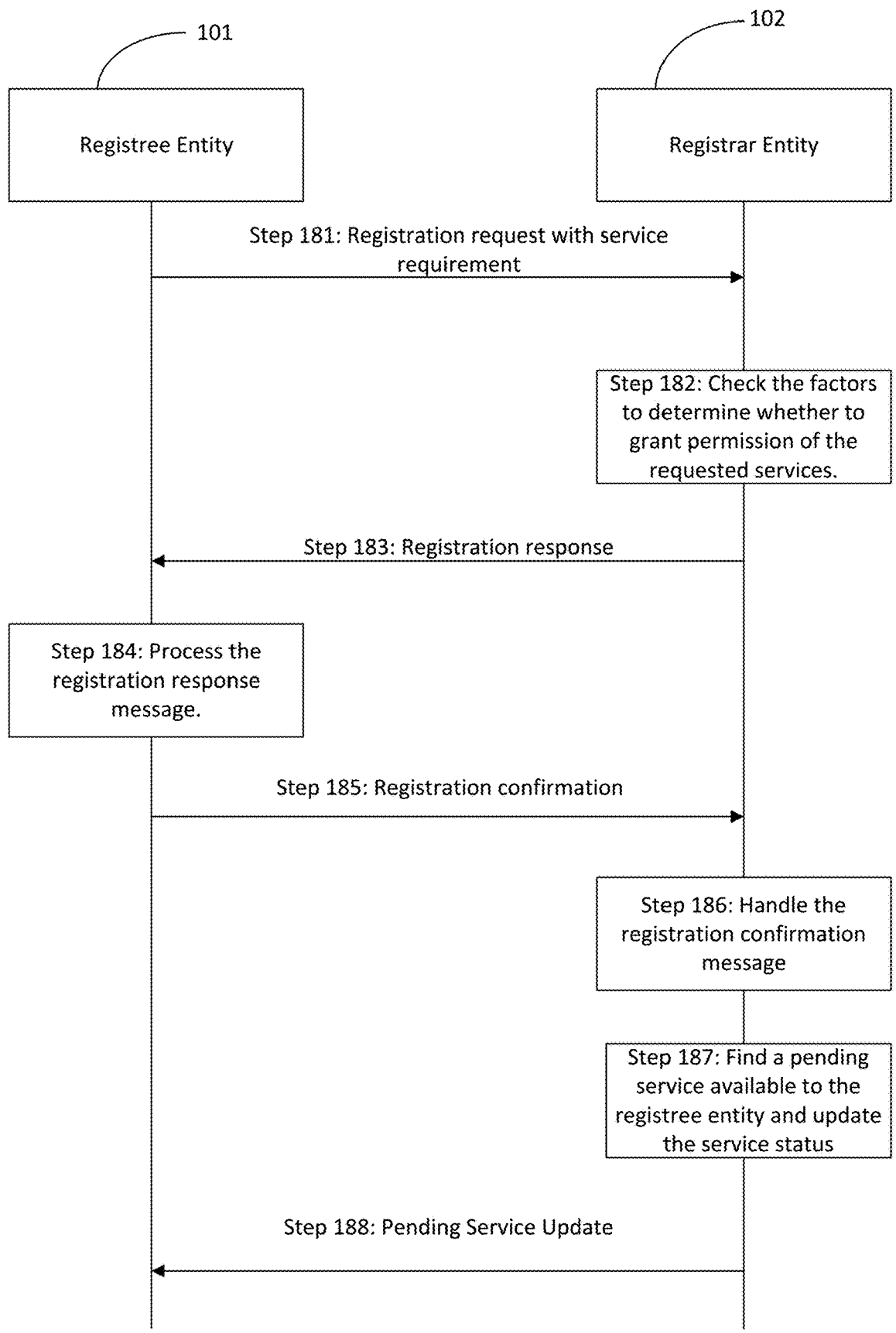
FIG. 8 illustrates an exemplary message flow for flexible service layer registration.
Figure 9:
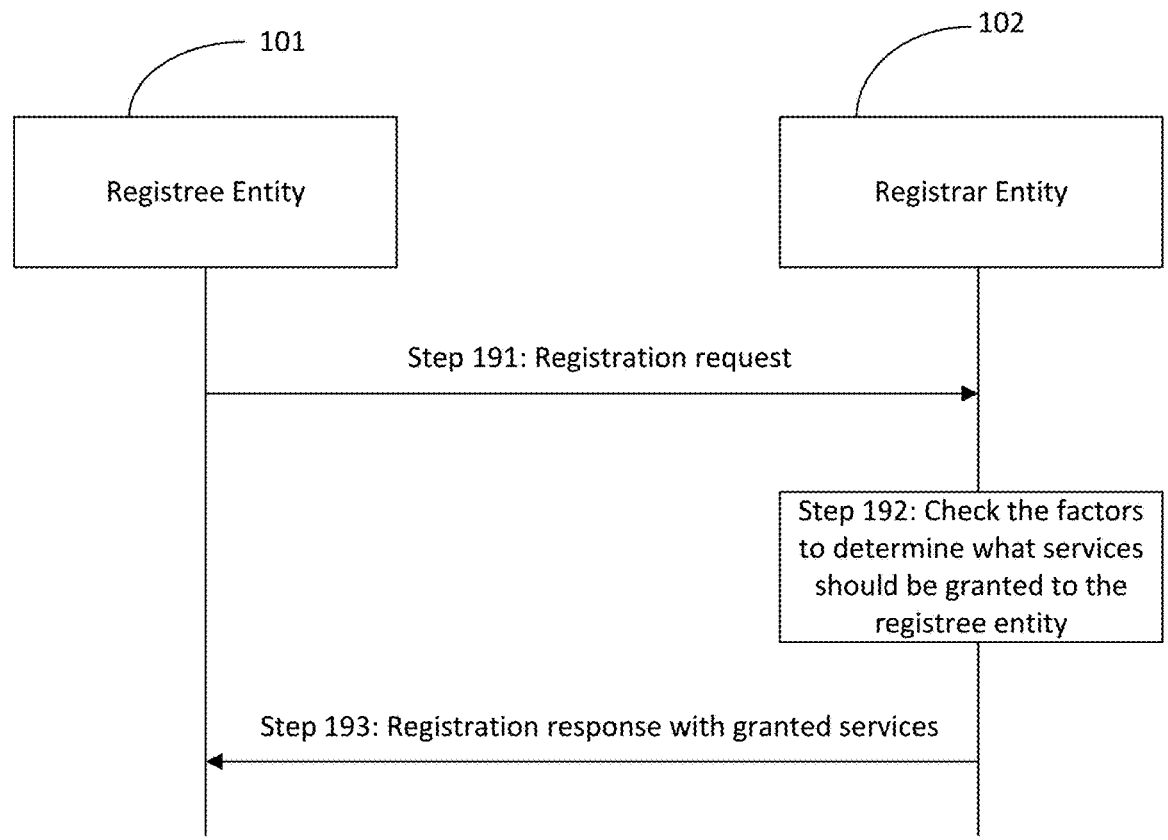
FIG. 9 illustrates an exemplary message flow for flexible service layer registration.
Figure 22A:
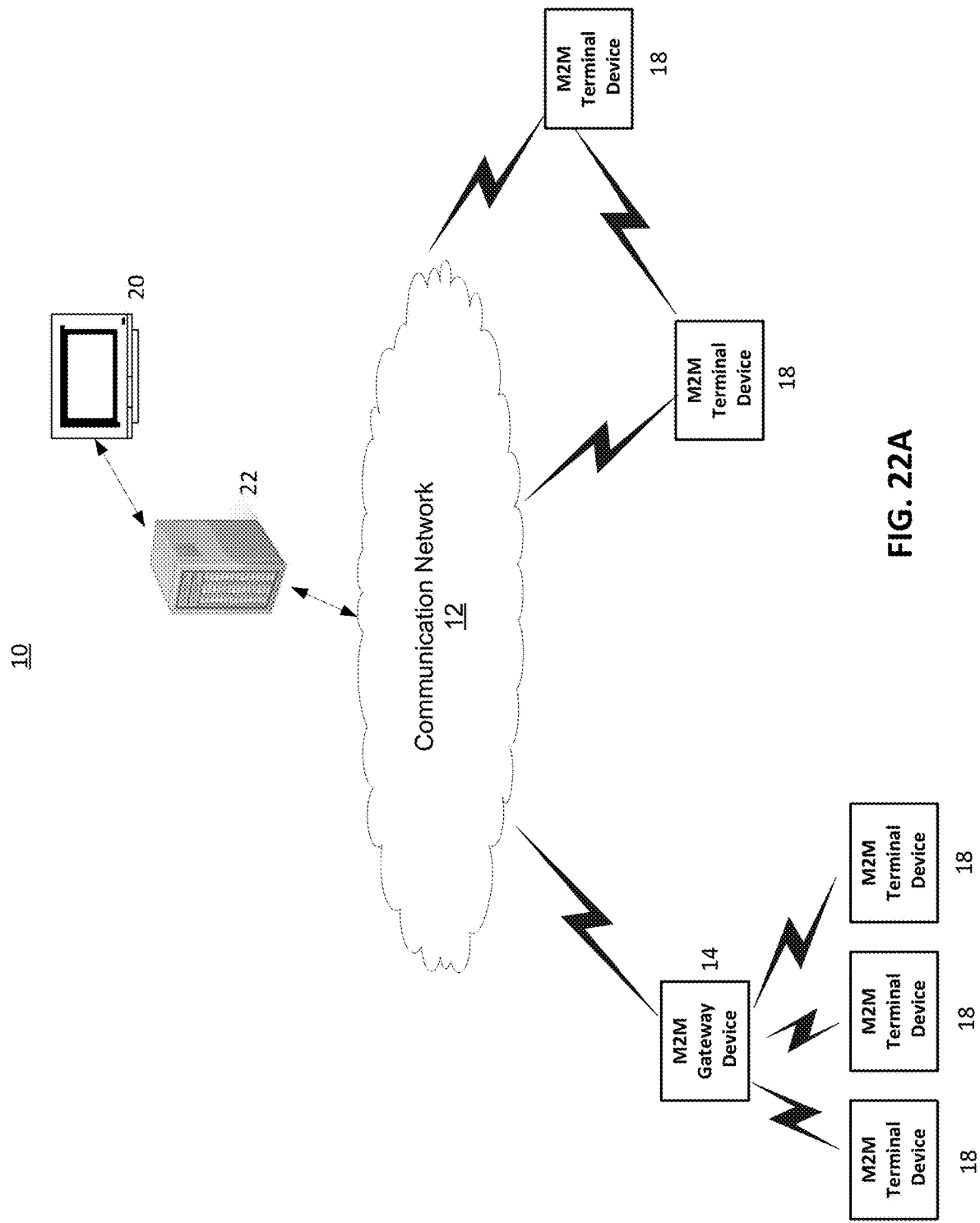
FIG. 22A is a system diagram of an example machine-to-machine (M2M) or Internet of Things (IoT) communication system in which the disclosed subject matter may be implemented.
Figure 22B:
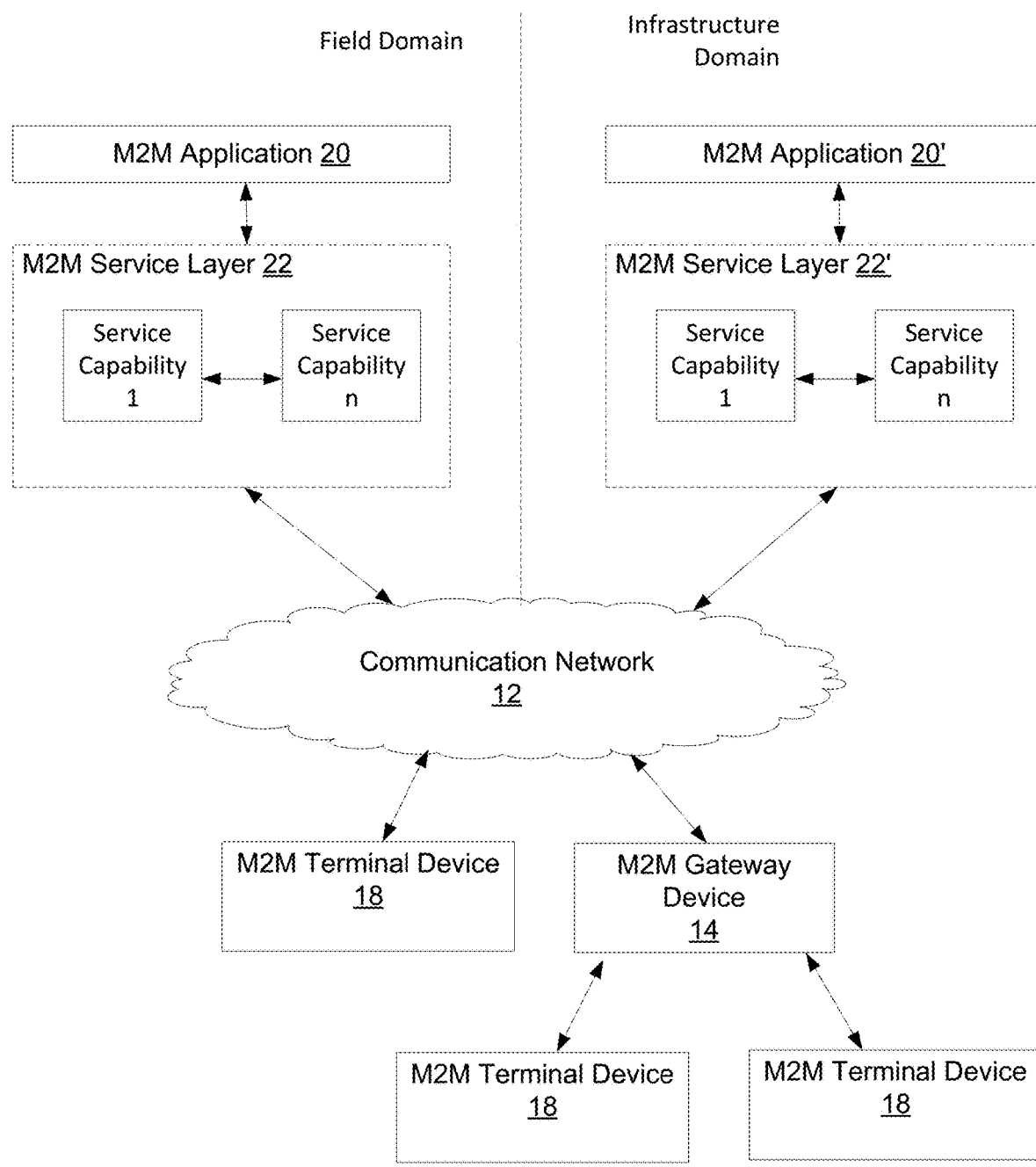
FIG. 22B is a system diagram of an example architecture that may be used within the M2M/IoT communications system illustrated in FIG. 22A.
Figure 22C:
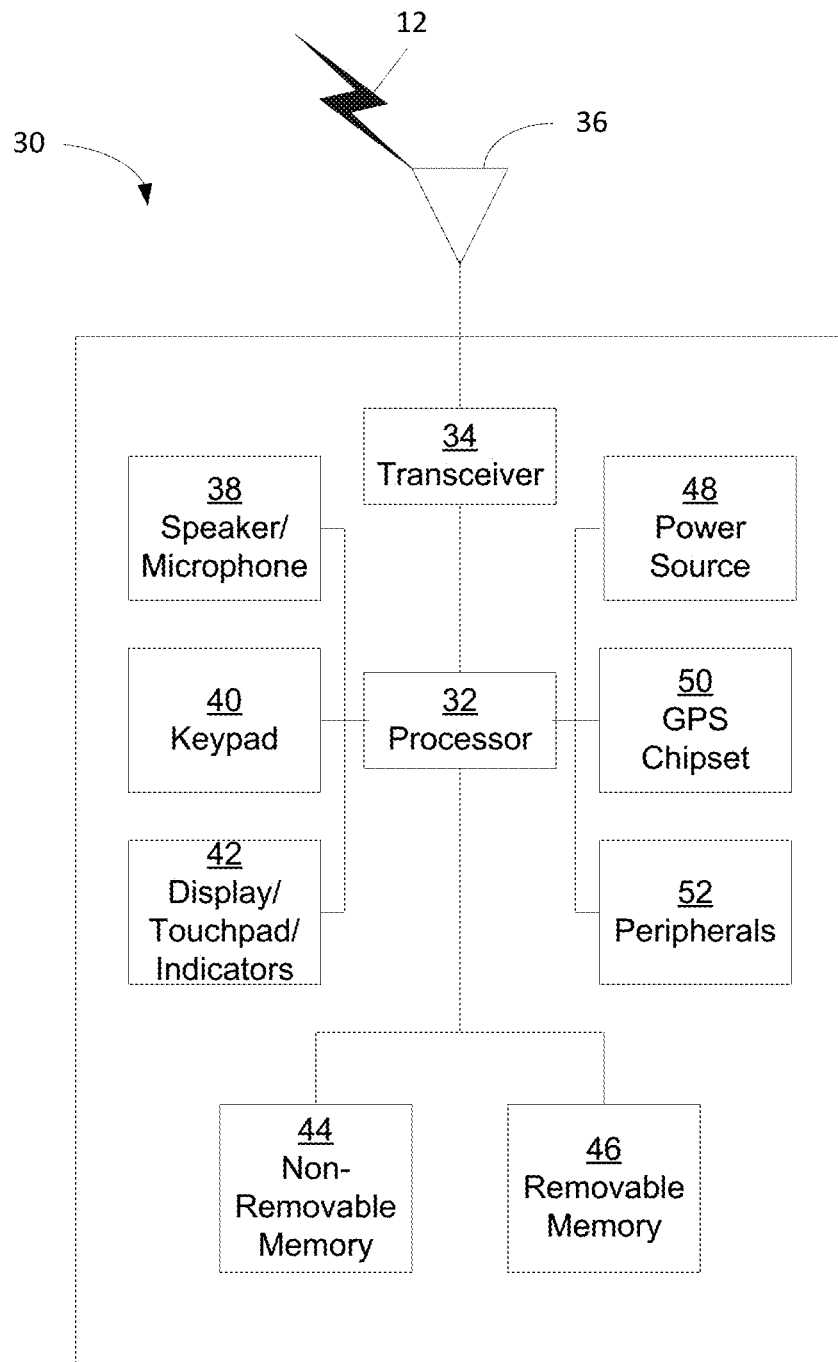
FIG. 22C is a system diagram of an example M2M/IoT terminal or gateway device that may be used within the communications system illustrated in FIG. 22A.
Figure 22D:
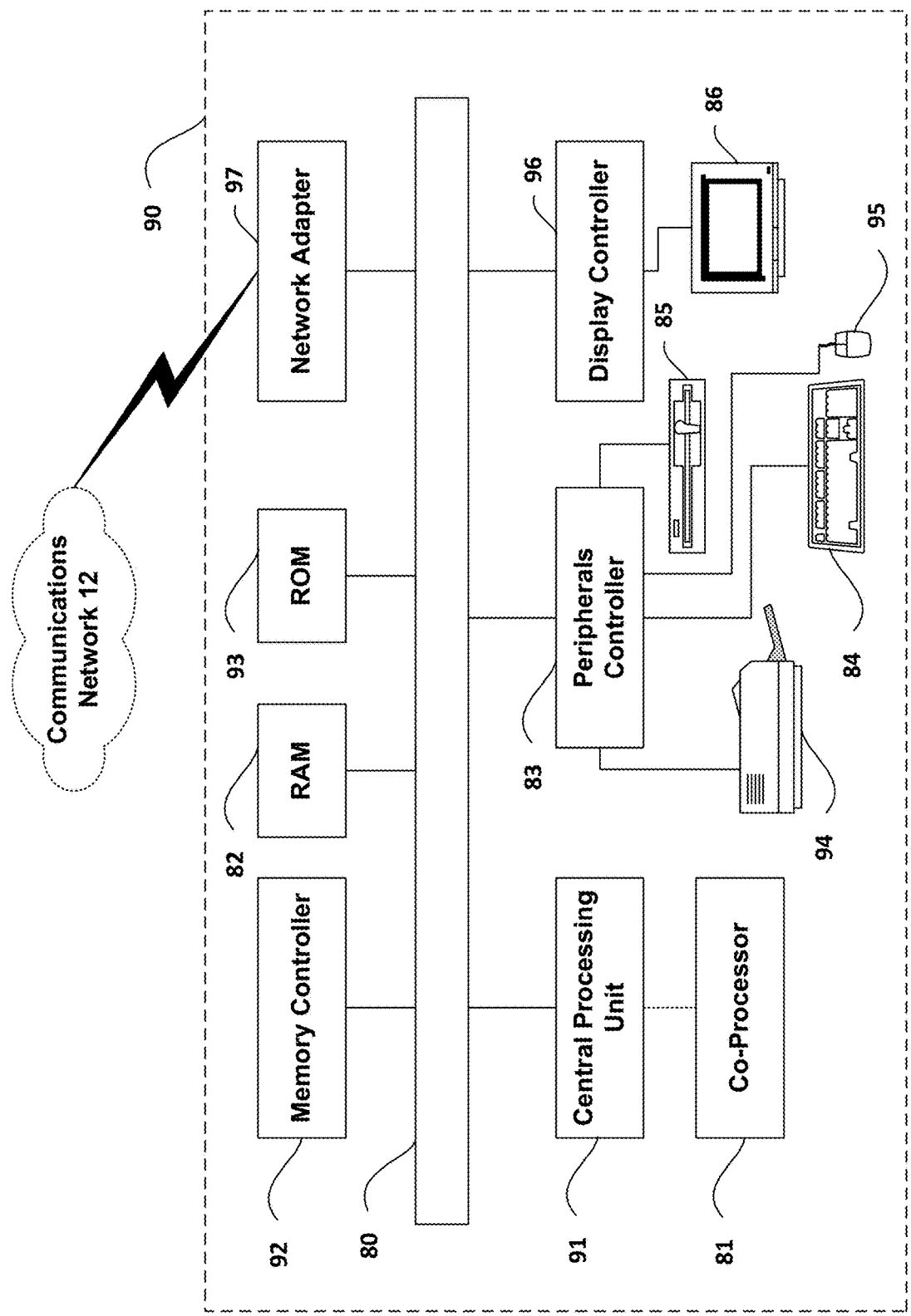
FIG. 22D is a block diagram of an example computing system in which aspects of the communication system of FIG. 22A may be embodied.

It is understood that the entities performing the steps illustrated in FIG. 8-FIG. 9 are logical entities that may be implemented in the form of software (e.g., computer-executable instructions) stored in a memory of, and executing on a processor of, a device, server, or computer system such as those illustrated in FIG. 22C or FIG. 22D. That is, the method(s) illustrated in FIG. 8-FIG. 9 may be implemented in the form of software (e.g., computer-executable instructions) stored in a memory of a computing device, such as the device or computer system illustrated in FIG. 22C or FIG. 22D, which computer executable instructions, when executed by a processor of the computing device, perform the steps illustrated in FIG. 8-FIG. 9, and FIG. 19. In an example, with further detail below with regard to the interaction of M2M devices, Registree 101 of FIG. 8 may reside on M2M terminal device 18 of FIG. 22A, while registrar 102 of FIG. 8 may reside on M2M gateway device 14 of FIG. 22A.

FIG. 8 illustrates an exemplary message flow for a first scenario. In summary, for this first scenario, registree entity 101 specifies the services that it wants registrar entity 102 to grant access within a registration request message. It is assumed in this disclosure, that through SL discovery functionalities (not discussed in detail herein), registree entity 101 is able to find out the entities that it can register to, as well as the services provided by each of the entities. In oneM2M architecture, the services provided by a CSE could be the CSFs, such as Discovery, Location, Communication Management and Delivery Handling, etc. The services provided by a CSE could be those that are not listed as one of the CSFs, such as Message Routing Service.

Details with regard to the first scenario illustrated in FIG. 8 are below. Here, registree entity 101 proactively requests services hosted by registrar entity 102 during registration. At step 181, registree entity 101 sends a message including a registration request to registrar entity 102. The message of step 181 may include the identifier(s) of the service(s) that are available on registrar entity 102 and requested by registree entity 101. At step 182, upon receiving the message of step 181, registrar entity 102 determines (based on factors) whether to accept registree entity 101's registration, whether to grant access of the requested services to registree entity 101, or what services will be granted to registree entity 101, among other things.

With continued reference to step 182 of FIG. 8, the following are some examples of factors that registrar entity 102 may take into consideration, in addition to registree entity 101's service subscription profile and access control policy. The factors may include maximum number of users, available capacity, service charges, priority of registree 101, or capability of registree 101 to handle services (e.g., processing power, memory, interfaces—graphical, etc.), among other things. For max number of users, the requested service may have a limit of max number of supported users. If the current active users are less than this number, then registree entity 101 may be granted access to the service. Otherwise, registree entity 101 may be rejected for this requested service. With regard to available capacity, registrar entity 102 may estimate the capacity that is needed to support registree entity 101 for the requested service. The capacity could be the computing capacity, battery, storage, load, and schedule etc. If registrar entity 102's available capacity is low, registree entity 101 may be rejected for this requested service. Otherwise, if registrar entity 102 has enough capacity, registree entity 101 can be granted access to this service. For service charge and registree 101's account balance, the requested service may have a service charge associated with it that is paid before using the service. Depending on registree 101's account balance, the service may be granted or not. Registrar entity 102 may need to communicate with the entity that is in charge of the charging and billing. For registree 101's priority, each registree entity may be in different classes or with different priority, e.g. platinum, gold, silver, etc. The class level differentiates the priority of registree entity 101 in gaining access to the requested service if there are other registrees also waiting for the same service.

With continued reference to step 182 of FIG. 8, registrar entity 102 may make the decisions on the requested services for registree entity 101. The decision may fall into the following lists: granted service list, rejected service list, or pending service list. Granted service list is the list of requested services that are granted by registrar entity 102 to registree entity 101. Each of the granted services may be associated with a time period (or a list of time intervals or max allowable usage/access times) during which registree entity 101 is eligible to use the service. If this field is left empty, then by default the service ends when registree entity 101 deregisters. Each of the granted services may also be associated with a mutuality attribute, which indicates whether the service is bi-directional or unidirectional. If the mutuality is bi-directional, it means that registree entity 101 also provides this service to registrar entity 102. For example, the Message Routing Service is by default bi-directional. If the mutuality is unidirectional, then the service is only provided from registrar entity 102 to registree entity 101. Rejected Service List is the list of requested services that are rejected by registrar entity 102. Each of the rejected service may be associated with the reason why registrar entity 102 rejects the service request from registree entity 101. The may be multiple reasons, such as not enough capacity, not enough balance for the service charge, etc. Each of the rejected service may be associated with the recommendedRegistrar, where the registree may get the service from. The rejected service list may be used later as a factor to decide whether to grant the same services to the same type of registree entities. The rejected service list information may be retrieved by the other entities which have similar type of the current registree entity, for example all of them are resource constrained devices (e.g., sensors with minimal memory, minimal processing, access to power/energy, insufficient wireless bandwidth and ability to communicate, etc.). Pending service list is the list of requested services that are in pending and may be granted access to registree entity 101 later. Each of the pending services may be associated with the order of registree entity 101 (the order indicates how many other registree entities are waiting in front of the current registree entity), and the estimated time period that registree entity 101 may need to wait.

With continued reference to FIG. 8, at step 183, registrar entity 102 returns the decisions in the response message. Table 1 shows the new fields in the response message, as well as the parameters (in italics) associated with each of these fields.

TABLE 1

New Fields in Registration Response Message

| grantedServiceID, validTime/maxUsage, mutuality | rejectedServiceID(s), reason, recommendedRegistrar | pendingServiceID, priorityOrder, estimatedWaitTime . . . |
|---|---|---|

Registrar entity 102 locally maintains the record of the registree entities that have registered to it as shown in Table 2. The record has the following fields. "Registree ID" is the unique identifier of registree entity 101 within the same SP domain. "Requested Service From" is the list of the identifiers of the services requested from registree entity 101 in the registration message. "Granted Service To" is the list of identifiers of the services granted by registrar entity 102 to registree entity 101. As discussed in step 182, each granted service may be associated with an attribute called validTime, which indicates the effective time period of the service that registrar entity 102 provides to registree entity 101. Each granted service may also be associated with an attribute called mutuality, which indicates whether the service is bi-directional or unidirectional. "Rejected Service To" is the list of identifiers of the services rejected by registrar entity 102 to registree entity 101. As discussed in step 182, each rejected service may be associated with an attribute called reason, which describes the reason why registrar entity 102 rejects the service request from registree entity 101. And each rejected service may also be associated with an attribute called recommendedRegistrar, which indicates the other entities that the current registrar entity recommends to registree entity 101, where registree entity 101 could request the service from.

With continued reference to step 183 of FIG. 8, "Pending Service To" is the list of identifiers of the services that are pending for registrar entity 102 to grant access to registree entity 101. As discussed in step 182, each pending service has the following attributes. estimatedWaitTime indicates the estimated wait time for registrar entity 102 to grant the access of the service to registree entity 101. allowedWaitTime indicates the allowed wait time from registree entity 101, which will be discussed in Step 184. The priorityOrder indicates the priority of registree entity 101 among other registree entities which are also requesting the same service. Status shows the status of the pending service, which is initially set to "waiting." If the service is granted before the allowed wait time, then the status is changed to "granted." If the service is rejected before the allowed wait time, then the status is changed to "rejected." If the service is still waiting when the allowed wait time expires, then the status is changed to "expired and rejected." Optionally, registrar entity 102 may move the services in pending service list that are granted to the granted service list, and move the services in pending service list that are rejected to the rejected service list.

TABLE 2

Registree Entity Record

| Registree ID | Requested Service From | Granted Service To (each is identified by the service identifier, the following columns show the associated attributes) | Rejected Service To (each is identified by the service identifier, the following columns show the associated attributes) | Pending Service To (each is identified by the service identifier, the following columns show the associated attributes) |
|---|---|---|---|---|
| | | validTime/max Usage mutuality | reason recommendedRegistrar | estimatedWaitTime allowedWaitTime priorityOrder status |

With continued reference to FIG. 8, at step 184, registree entity 101 processes the response message. If registree entity 101 finds that there is granted service with bi-directional type, then it confirms whether this service is supported by itself and can be granted to registrar entity 102. If registree entity 101 finds that there is rejected service, optionally it may choose another SL entity to register with and request the rejected service. If registree entity 101 finds that there is pending service, registree entity 101 may take one of the following actions. A first action may be that registree entity 101 may choose another SL entity to register with and request the pending service. And it will send registration confirmation message in Step 185 to terminate service request by setting the allowed wait time to 0. A second action, registree entity 101 may be willing to wait for the pending service to be granted. It can send registration confirmation message in step 185 to indicate how long it can wait by setting up the allowed wait time.

With continued reference to FIG. 8, at step 185, registree entity 101 may send registration confirmation message. Table 3 shows the new fields in the confirmation message, as well as the parameters (in italics) associated with each of these fields.

TABLE 3

| New Fields in Registration Confirmation Message | |
| --- | --- |
| pendingServiceID | grantedServiceID |
| allowedWaitTime | |

With continued reference to FIG. 8, at step 186, registrar entity 102 handles the registration confirmation message and sets up the allowed wait time for each pending service of registree entity 101. If allowedWaitTime is 0 or less than 0, the pending service request is canceled. The pending service is deleted for registree entity 101 record. If allowedWaitTime is not blank and larger than 0, the pending service's allowedWaitTime is updated for registree entity 101 record. If allowedWaitTime is blank, the pending service's allowedWaitTime is assumed to be unlimited for registree entity 101. In other words, registree entity 101 will be always in the pending list of the service and waits for its turn. At step 187, registrar entity 102 monitors the status of the pending service. If it finds that the pending service can be granted to registree entity 101 after some time. It will check if it is still within registree entity 101's allowed wait time. If yes, it will send the pending service update message as in Step 188 to registree entity 101. If the allowed wait time expires, the pending service is rejected by registrar entity 102. In the meantime, registrar entity 102 updates the status of the pending service maintained locally. If the pending service was granted, registrar entity 102 adds the service ID to the granted service ID field. If the pending service was rejected, registrar entity 102 adds the service ID to the rejected service ID field.

With continued reference to FIG. 8, at step 188, registrar entity 102 sends the pending service update message to registree entity 101 when a pending service's status is updated. Table 4 shows the new fields in the confirmation message, as well as the parameters (in italics) associated with each of these fields. The status can be either granted or rejected. If the status is granted, then the type of the service is indicated as described in step 182.

TABLE 4

| New Fields in Pending Service Update Message pendingServiceID |
| --- |
| status |

After the initial registration with service request, the following actions may happen between registree entity 101 and registrar entity 102. Registree entity 101 is entitled to cancel a granted service from registrar entity 102 by sending a Service Cancellation Request, which will include the service identifier. Registrar entity 102 will terminate the service to registree entity 101 and remove registree entity 101 from the granted user list of the service. Registree entity 101 is also entitled to request a new service or services from registrar entity 102 by sending a Service Request, which will include the identifier of the service (note, a service discovery procedure may happen beforehand, which can be carried out by the filter criteria based discovery or more advanced discovery mechanisms, e.g. semantics based query). Registrar entity 102 will follow the similar procedures described above to grant/reject the request service. Registrar entity 102 may choose to terminate a service granted to registree entity 101. Registrar entity 102 may send a message for Service Termination Notification to registree entity 101 that includes the identifier of the service. The message for service termination notification may also include the grace period of the service termination.

FIG. 9 illustrates an exemplary message flow for a second scenario. In summary, for this second scenario, registree entity 101 does not proactively request the services hosted in the registrar entity 102 within the registration message. Thus the existing registration message does not need to be modified in this scenario. At step 191, registree entity 101 sends the registration message (no modification needed for the existing registration message) to registrar entity 102.

With continued reference to FIG. 9, at step 192, registrar entity 102 checks the factors to determine what services should be granted to registree entity 101. The factors listed in Step 182 with regard to FIG. 8 are applicable. Registrar entity 102 may consider registree entity 101 type (note, the information related to the following factors may be included in the registration message as semantics information of the registree, e.g. type of the registree). Registree entity 101 may be a resource-constrained type device that only senses and reports data, thus registree entity 101 may only need certain services, such as Data Management and Repository Service, Device Management Service, Location Service, etc. Registree entity 101 may be the type that does not need Discovery Service, Service Charging and Accounting Service, etc. Registree entity 101 may be a type of device that hosts applications to retrieve and use data stored by registrar entity 102. Thus registree entity 101 may only need certain service, such as Data Management and Repository Service, Discovery Service, Subscription and Notification Service, etc. Registree entity 101 may not need Device Management, Network Service Exposure Service, etc. Registree entity 101 may be a gateway type device that mainly forwards messages that are not originated from it. Thus registree entity 101 may only need certain services, such as Communication Management and Delivery Handling Service, Message Routing Service, etc. Registree entity 101 may not need Data Management and Repository Service, Device Management Service, etc. At step 193, registrar entity 102 returns the registration response with granted service list to registree entity 101.

Figure 10:
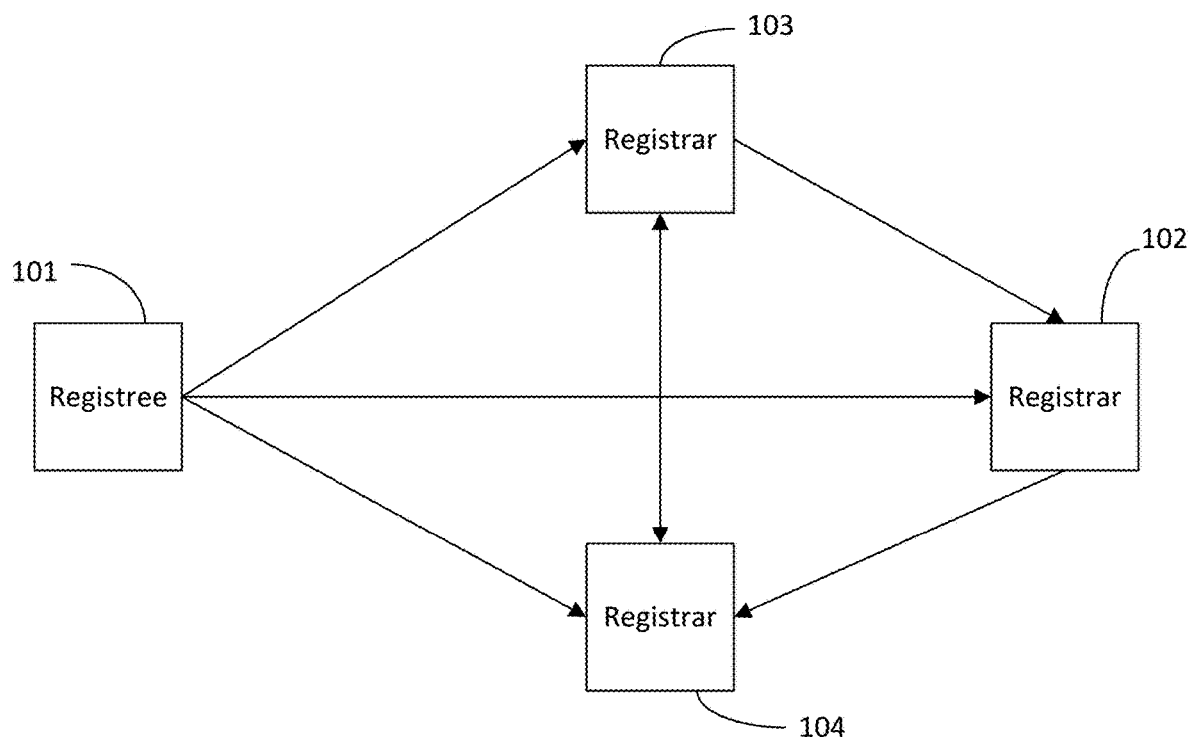
FIG. 10 illustrates an exemplary registration to multiple registrar entities.

FIG. 10 illustrates an exemplary registration to multiple registrar entities. A concatenation (registration chain) of multiple uni-directional registrations may form a loop. E.g. in oneM2M, two MN-CSEs A and B, can register with each other. Three MN-CSEs A, B and C, where A registers to B, and B registers to C, and C may also register to A. FIG. 10 illustrates an example from one registree entity (registree entity 101) to multiple registrar entities (registrar entity 102, registrar entity 103, and registrar entity 104). Registrar entity 102, registrar entity 103, and registrar entity 104 already have formed registration loop between them. The registrar entity 103 and registrar entity 104 have registered with each other. This is contrary to the conventional SL registration.

With reference to FIG. 10, the registration between any registree and registrar entity pair may follow the first scenario (e.g., FIG. 8 and associated discussion) or the second scenario (e.g., FIG. 9 and associated discussion). In other words, a registree entity may register to a registrar entity as described in the first scenario, but register to another registrar entity as described in the second scenario. Assuming the situation that contains a first scenario and second scenario, in an example, the registration to multiple registrar entities may be carried out in a multicast registration message originating from the same registree entity.

For a SL entity, there are multiple ways that the SL entity may be granted access to certain service from another SL entity. In a first way, the SL entity registers to another SL entity as discussed in the first scenario or the second scenario. Thus the SL entity is granted access of the service as a registree entity. In a second way, the SL entity is being registered by another SL entity for certain service. But the service has the type of bi-directional. The SL entity as a registrar entity also is granted access of the service from the registree entity.

Each SL entity also maintains a record of the SL entities that it itself receives services from as shown in Table 5. SL Entity ID shows the unique identifier of the SL entity that provides certain services to the local SL entity. "Granted Service From" is the list of identifiers of the services that are granted from the SL Entity to the local SL entity. Each granted service may be associated with an attribute called validTime, which indicates the effective time period of the service that the SL entity provides to the local SL entity.

TABLE 5

Record of SL Entities Providing Services to the Local SL Entity

| SL Entity ID | Granted Service From |
|---|---|
| | validTime | oneM2M examples are discussed in more detail below. An AE may be registered to more than one CSE (e.g., ASN-CSE 161, MN-CSE 162, or IN-CSE 164). ASN-CSE 161 may be registered to more than one other CSE (e.g., MN-CSE 163 or IN-CSE 164). MN-CSE 163 may be registered to more than one other CSE (MN-CSE 162 or IN-CSE 164). An IN-CSE may be registered to more than one other CSE (IN-CSE). A concatenation (registration chain) of multiple uni-directional registrations may form a loop. E.g. two MN-CSEs A and B (e.g., registrar 103 and registrar 104), may register with each other. There may be three MN-CSEs A, B and C (e.g., registrar 103, registrar 102, and registrar 104, respectively), where A registers to B, and B registers to C, then C may register to A.

An AE or CSE may register to a CSE and proactively request to gain access to the local services hosted by the registrar CSE. The registrar CSE may accept a registree AE or CSE's registration request, but only grant access to a partial set of services to the registree AE or CSE instead of all its services.

A registree AE or CSE may not need to proactively request the services within its registration request message. The registrar CSE may decide what services may be needed by the registree AE or CSE and grant access of those services to the registree AE or CSE.

In order to support the flexible service layer registration summarized herein, new attributes and new child resources as discussed below should be added to remoteCSE and AE resource.

<CSEBase> Resource Enhancement

Figure 11:
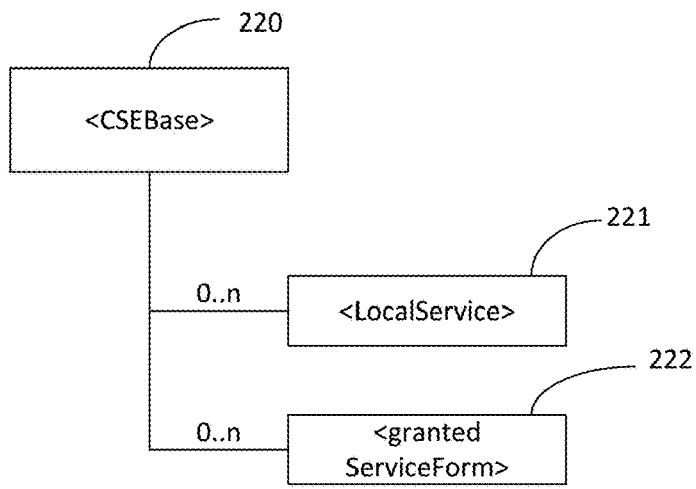
FIG. 11 illustrates exemplary child resources added to <CSEBase>.

FIG. 11 illustrates exemplary new child resources added to <CSEBase>. <CSEBase> 220 may contain the new child resources: <localService> 221 and <grantedServiceFrom> 222 as shown in Table 6.

TABLE 6

New Child Resources of <CSEBase>

| New Child Resources of <CSEBase> | Child Resource Type | Multiplicity | Description |
|---|---|---|---|
| [variable] | <localService> | 0 . . . n | This child resource holds the local services hosted by the CSE, as discussed in more detail herein. |
| [variable] | <grantedServiceFrom> | 0 . . . n | This child resource holds the granted services from other CSEs to the current hosting CSE, as discussed in more detail herein. |

<remoteCSE> Resource Enhancement

Figure 12:
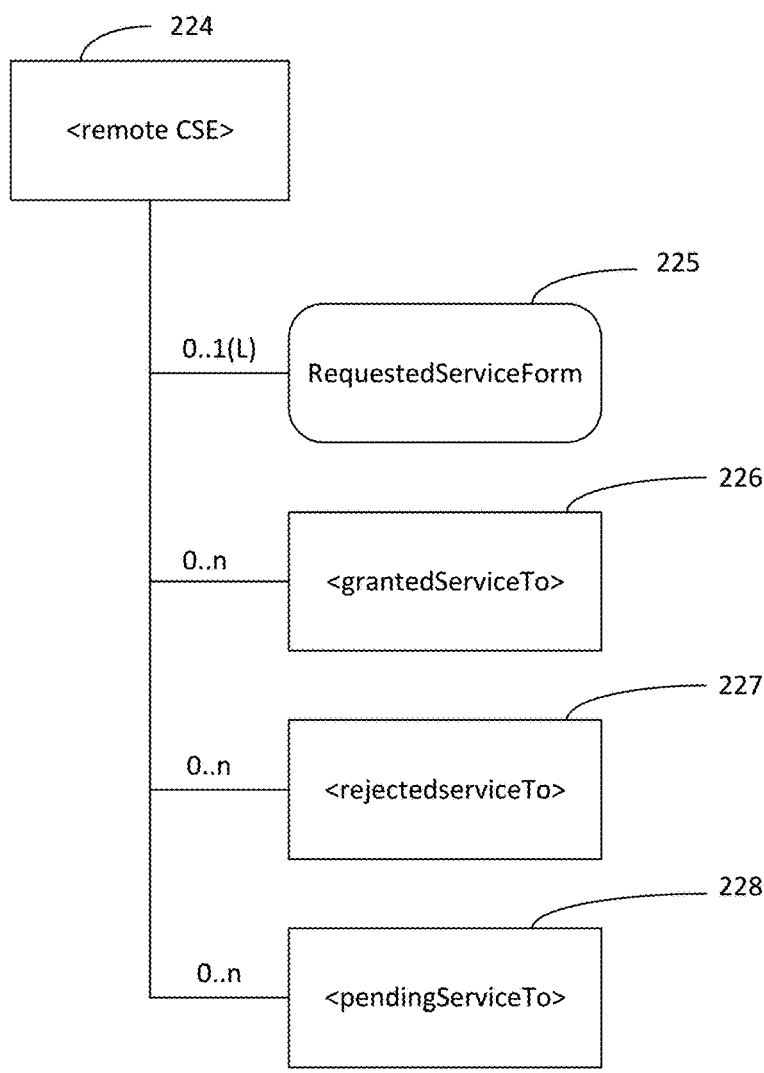
FIG. 12 illustrates exemplary child resources and attribute added to <remoteCSE>.

FIG. 12 illustrates exemplary new child resources and attribute added to <remoteCSE> 224. A <remoteCSE> 224 may contain the new child resources: <grantedServiceTo> 226, <rejectedServiceTo> 227, <pendingServiceTo> 228 as shown in Table 7. A <remoteCSE> 224 may contain the new attribute: requestedServiceFrom 225 as shown in Table 8.

TABLE 7

New Child Resources of <remoteCSE>

| New Child Resources of <remoteCSE> | Child Resource Type | Multiplicity | Description |
|---|---|---|---|
| [variable] | <grantedServiceTo> | 0 . . . n | This child resource holds the granted services to the remoteCSE by the current |

TABLE 7-continued

New Child Resources of <remoteCSE>

| New Child Resources of <remoteCSE> | Child Resource Type | Multiplicity | Description |
|---|---|---|---|
| | | | hosting CSE, as discussed in more detail herein. |
| [variable] | <rejectedServiceTo> | 0 . . . n | This child resource holds the services that the hosting CSE rejects to grant access to the remoteCSE, as discussed in more detail herein. |
| [variable] | <pendingServiceTo> | 0 . . . n | This child resource holds the pending services that the hosting CSE puts the remoteCSE in the waiting list, as discussed in more detail herein. |

TABLE 8

New Attribute of <remoteCSE>

| New Attributes of <remoteCSE> | Multiplicity | RW/ RO/ WO | Description |
|---|---|---|---|
| requestedServiceFrom | 0 . . . 1(L) | WO | Indicates the list of identifiers of services requested by the remoteCSE during registration and after registration. |

<AE> Resource Enhancement

Figure 13:
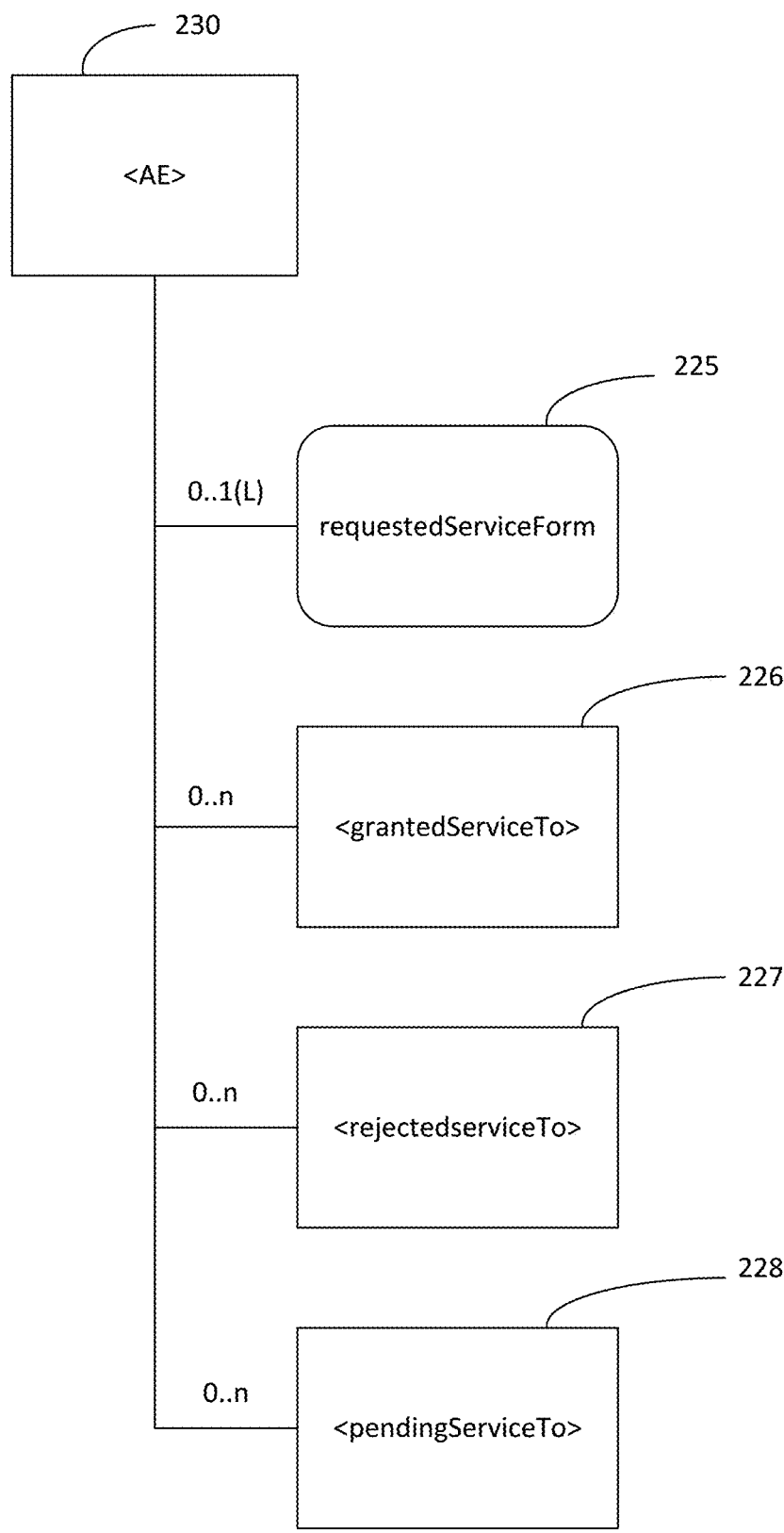
FIG. 13 illustrates exemplary child resources and attribute added to <AE>.

FIG. 13 illustrates exemplary new child resources and attribute added to <AE> 230. An <AE> 230 may contain the new child resources: <grantedServiceTo> 226, <rejectedServiceTo> 227, and <pendingServiceTo> 228, as shown in Table 9. An <AE> may contain the new attribute: requestedServiceFrom 225, as shown in Table 10.

TABLE 9

New Child Resources of <AE>

| New Child Resources of <AE> | Child Resource Type | Multiplicity | Description |
|---|---|---|---|
| [variable] | <grantedServiceTo> | 0 . . . n | This child resource holds the granted services to the AE by the hosting CSE, as discussed in more detail herein. |
| [variable] | <rejectedServiceTo> | 0 . . . n | This child resource holds the services that the hosting CSE rejects to grant access to the AE, as discussed in more detail herein. |
| [variable] | <pendingServiceTo> | 0 . . . n | This child resource holds the pending services that the hosting CSE puts the AE in the waiting list, as discussed in more detail herein. |

TABLE 10

New Attribute of <AE>

| New Attributes of <AE> | Multiplicity | RW/ RO/ WO | Description |
|---|---|---|---|
| requestedServiceFrom | 0 . . . 1(L) | WO | Indicates the list of identifiers of services requested by the AE during registration and after registration. |

<localService> Resource

Figure 14:
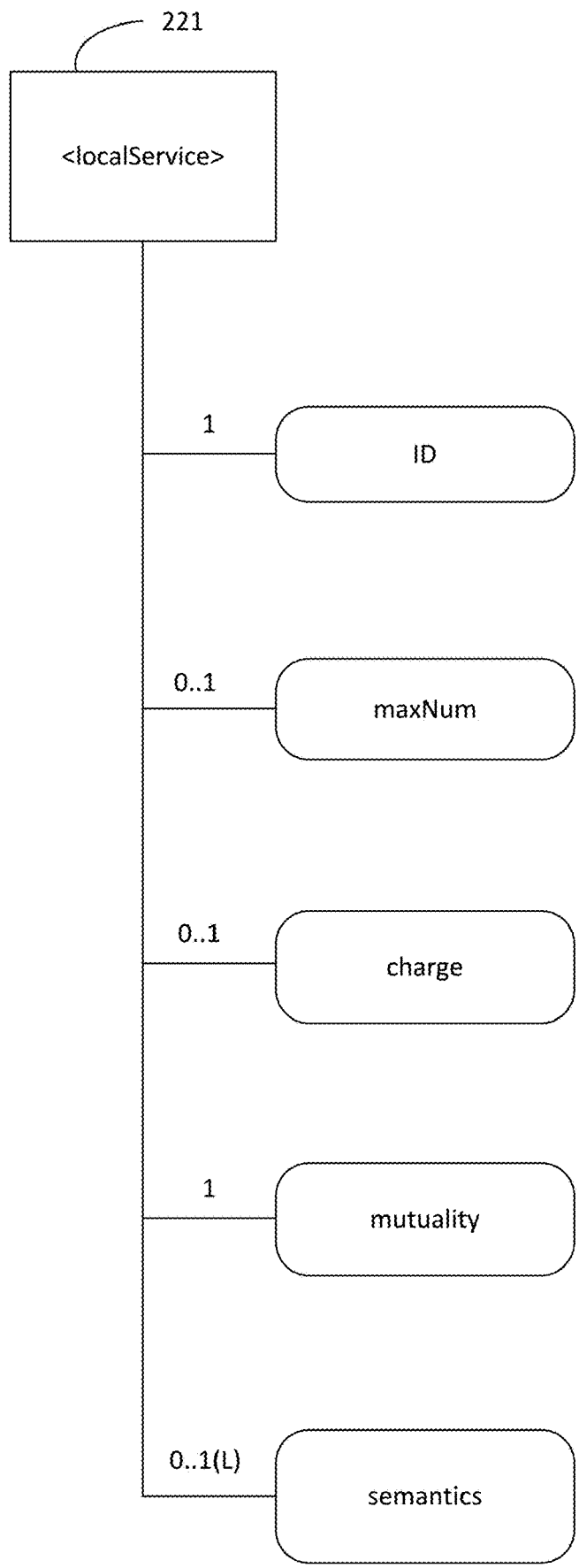
FIG. 14 illustrates an exemplary <localService> resource.

FIG. 14 illustrates an exemplary <localService> 221 resource that holds the services provided by the hosting CSE, which could be the CSFs, such as Discovery, Location, Communication Management and Delivery Handling, etc. The local service could also be services other than CSFs, such as the message forwarding service as described herein that is implicitly provided by each CSE when it is an intermediate node, or services enabled by the data held in the CSE (e.g., temperature service, traffic monitoring service, etc.). Table 11 shows the attributes of <localService> 221. The common attributes are not shown in the table. Note, the accessControlPolicyIDs attribute of the <localService> 221 resource includes the list of identifiers of the access right policies which indicate the AEs or CSEs that are granted with access to the service.

The <localService> 221 Resource has parent of <CSE-Base> 220.

TABLE 11

Attributes of <localService>

| Attributes of <grantedServiceTo> | Multiplicity | RW/ RO/ WO | Description |
|---|---|---|---|
| ID | 1 | WO | Indicates the unique identifier of the local service, which differentiates from the identifiers of other local service provided by the hosting CSE. |
| maxNum | 0 . . . 1 | RW | Indicates the max number of supported users to use the local service. |
| charge | 0 . . . 1 | RW | Indicates the charge that a CSE or AE needs to pay to use the local service, which could be a link to a chargingPolicy resource |
| mutuality | 1 | WO | Indicates whether the service is bi-directional or unidirectional. |
| semantics | 0 . . . 1(L) | RW | Describes the semantics information of the local service, which could be used to carry out semantics-based discovery on the local service. |

<grantedServiceTo> Resource

Figure 15:
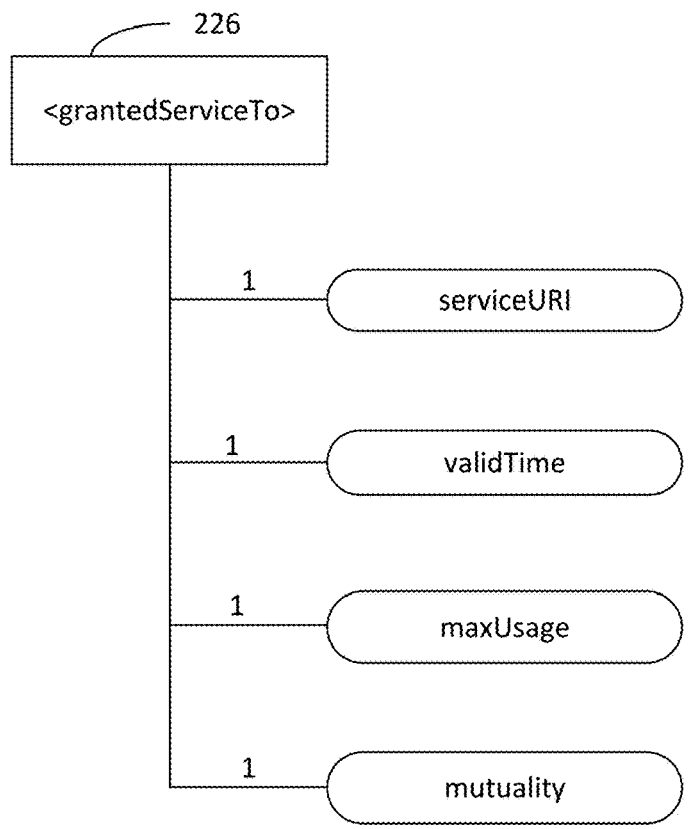
FIG. 15 illustrates an exemplary <grantedServiceTo> resource.

FIG. 15 illustrates an exemplary <grantedServiceTo> 226 resource that holds the granted services to a remoteCSE or AE by the hosting CSE. Table 12 shows the attributes of <grantedServiceTo> 226.

The <grantedServiceTo> 226 resource has parent of <AE> 230 or <remoteCSE> 224. This resource will be targeted when another CSE wants to know the granted services to the same AE or remoteCSE such that it can collaborate with the local CSE in providing the services.

TABLE 12

Attributes of <grantedServiceTo>

| Attributes of <grantedServiceTo> | Multiplicity | RW/ RO/ WO | Description |
|---|---|---|---|
| serviceURI | 1 | WO | Indicates the URI of the granted service from the local CSE to an AE or CSE. |
| validTime | 1 | WO | Indicates the effective time period of the service that the hosting CSE provides to the registree AE or CSE. |
| maxUsage | 1 | WO | Indicates the maximum number of usage of the service that the registree AE or CSE could use. |
| mutuality | 1 | WO | Indicates whether the service is bi-directional or unidirectional. |

<rejectedServiceTo> Resource

Figure 16:
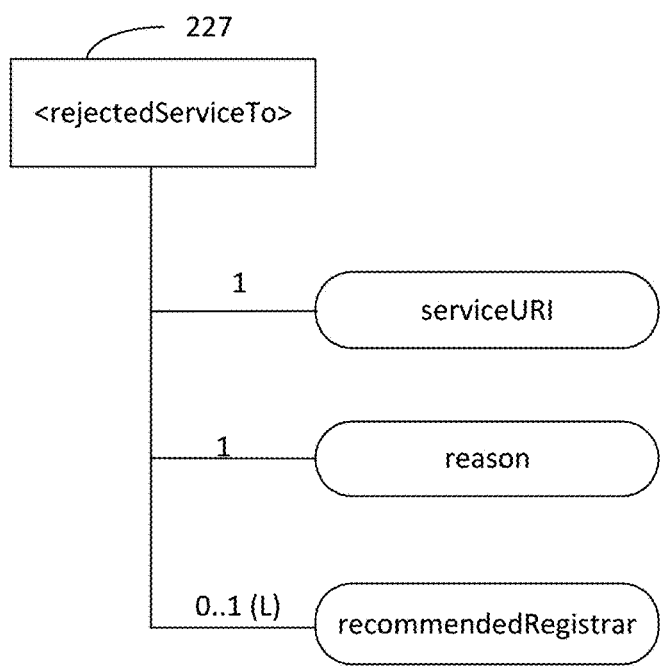
FIG. 16 illustrates an exemplary <rejectedServiceTo> resource.

FIG. 16 illustrates an exemplary <rejectedServiceTo> 227 resource that holds the services that the hosting CSE rejects to grant access to a CSE or AE. Table 13 shows the attributes of <rejectedServiceTo> 227.

The <rejectedServiceTo> 227 resource has parent of <AE> 230 or <remoteCSE> 224. An AE/CSE may retrieve this information of similar type of AE/CSE to understand what services may be granted by the registrar CSE, without including a whole list that may be rejected.

TABLE 13

Attributes of <rejectedServiceTo>

| Attributes of <grantedServiceTo> | Multiplicity | RW/ RO/ WO | Description |
|---|---|---|---|
| serviceURI | 1 | WO | Indicates the URI of the rejected service from the local CSE to an AE or CSE. |
| reason | 1 | WO | Describes the reason why the hosting CSE rejects the service request from the registree AE or CSE. |
| recommendedRegistrar | 0 . . . 1(L) | WO | Indicates the registrar CSE that the current CSE recommended to the registree AE or CSE, where it may obtain the rejected service from. |

<pendingServiceTo> Resource

Figure 17:
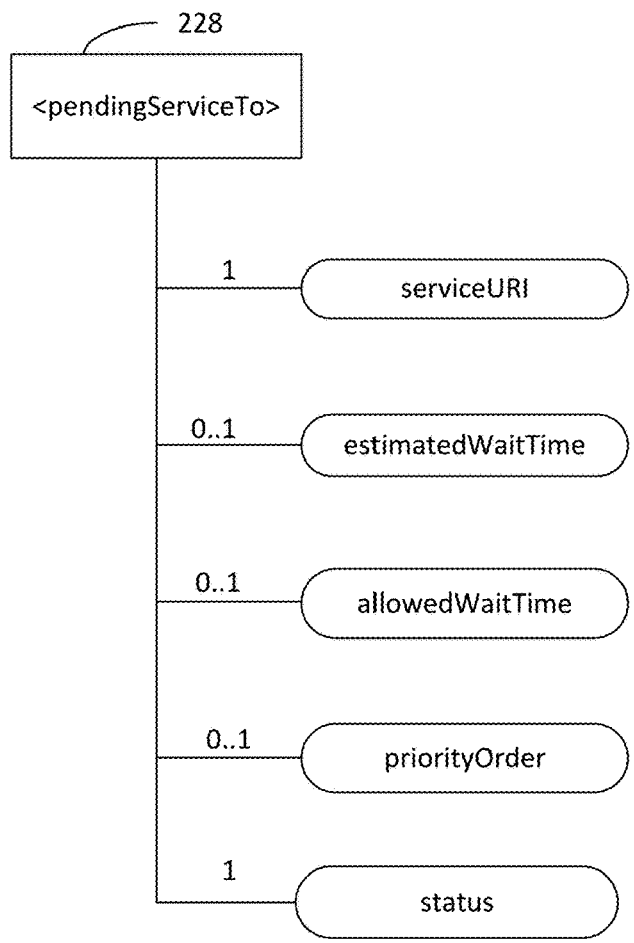
FIG. 17 illustrates an exemplary <pendingServiceTo> resource.

FIG. 17 illustrates an exemplary <pendingServiceTo> 228 resource that holds the pending services that an AE or CSE is waiting to be granted by the hosting CSE. Table 14 shows the attributes of <pendingServiceTo> 228.

The <pendingServiceTo> 228 resource has parent of <AE> 230 or <remoteCSE> 224.

TABLE 14

Attributes of <pendingServiceTo>

| Attributes of <grantedServiceTo> | Multiplicity | RW/ RO/ WO | Description |
|---|---|---|---|
| serviceURI | 1 | WO | Indicates the URI of the service that is pending to the registree AE or CSE. |
| estimatedWaitTime | 0 ... 1 | WO | Indicates the estimated wait time for the hosting CSE to grant the access of the service to the registree AE or CSE. |
| allowedWaitTime | 0 ... 1 | WO | Indicates the allowed wait time from the registree AE or CSE. |
| priorityOrder | 0 ... 1 | RW | Indicates the priority of the registree AE or CSE among other registree AE/CSEs which are also requesting the same service from the hosting CSE. |
| status | 1 | RW | Shows the status of the pending service, which is initially set to "waiting." If the service is granted before the allowed wait time, then the status is changed to "granted." If the service is rejected before the allowed wait time, then the status is changed to "rejected." If the service is still waiting when the allowed wait time expires, then the status is changed to "expired and rejected." |

<grantedServiceFrom> Resource

Figure 18:
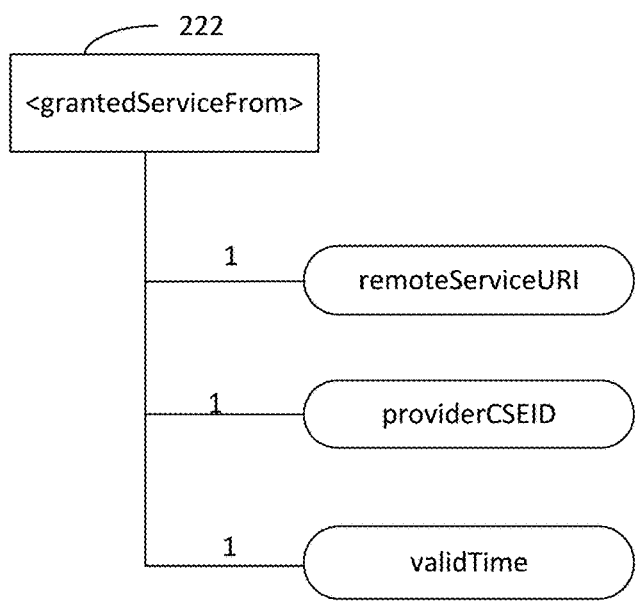
FIG. 18 illustrates an exemplary <grantedServiceFrom> resource.

FIG. 18 illustrates an exemplary <grantedServiceFrom> 222 resource that holds the granted services from a CSE to the hosting CSE. Table 15 shows the attributes of <grantedServiceFrom>.

The <grantedServiceFrom> 222 resource has parent of <CSEBase> 220.

TABLE 15

Attribute of <grantedServiceFrom>

| Attributes of <grantedServiceFrom> | Multiplicity | RW RO/ WO | Description |
|---|---|---|---|
| remoteServiceURI | 1 | WO | Indicates the URI of the remote service that is provided by a CSE to the local CSE |
| providerCSEID | 1 | WO | Indicates the CSE-ID of the CSE that is providing the service to the local CSE. |
| validTime | 1 | WO | Indicates the effective time period of the service that the remoteCSE provides to the hosting CSE. |

Figure 19:
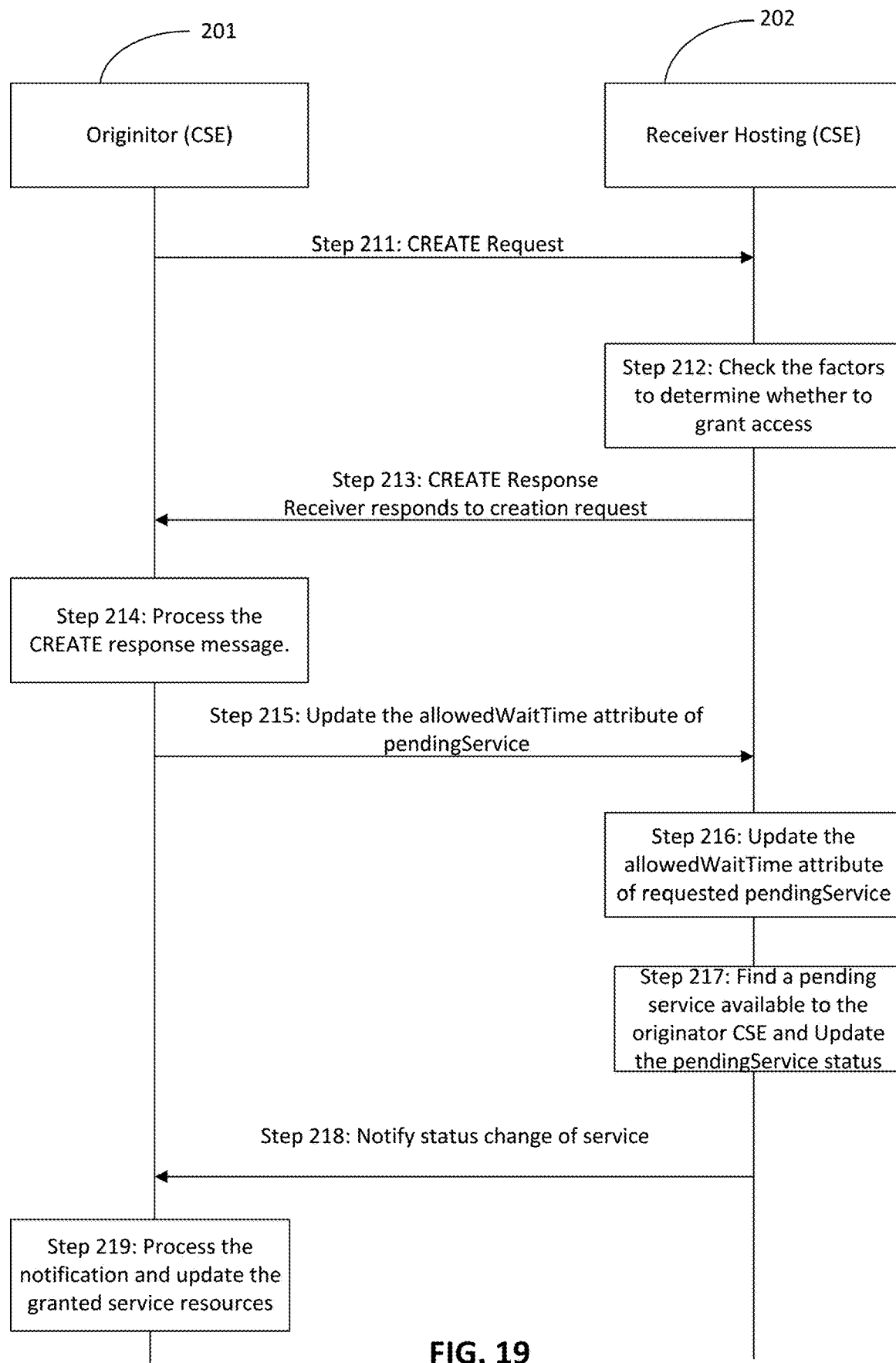
FIG. 19 illustrates an exemplary message flow of flexible registration in oneM2M.

FIG. 19 illustrates an exemplary message flow for flexible registration. At step 211, Originator 201 sends a CREATE request message to receiver 202. The requestedService parameter may be included in the message of step 211. Originator 201 requests creation of a remoteCSE resource with a requestedService parameter. At step 212, receiver 202 performs creation of <remoteCSE> resource. Receiver 202 checks the factors to determine whether to grant access of the requested services and create a remoteCSE resource. If there is pending service, receiver 202 creates subscription to the pendingServiceTo resource for originator 201, such that originator 201 receives notifications of the status change of the pending service. At step 213, receiver 202 responds with a response message. The response message of step 213 may include grantedServiceTo, rejectedServiceTo, and pending- ServiceTo. At step 214, originator 201, upon receipt of the CREATE response message, creates a <remoteCSE> resource locally under its <CSEBase> resource. This resource is representing receiver 202 (the hosting CSE). Originator 201 processes the grantedServiceTo, pendingServiceTo and takes action accordingly as discussed herein (e.g., FIG. 8). At step 215, originator 201 may issue a UPDATE Request towards receiver 202 (same To as for the CREATE request message) to update the allowedWaitTime attribute of pendingService. At step 216, receiver 202 updates the allowedWaitTime attribute of the corresponding pendingService. At step 217, receiver 202 finds a pendingService available to originator 201 and updates the pendingService status accordingly. At step 218, receiver 202 issues a NOTIFY request towards originator 201 to notify the status change of services. At step 219, originator 201 processes the notification and updates the grantedService resource.

Figure 20:
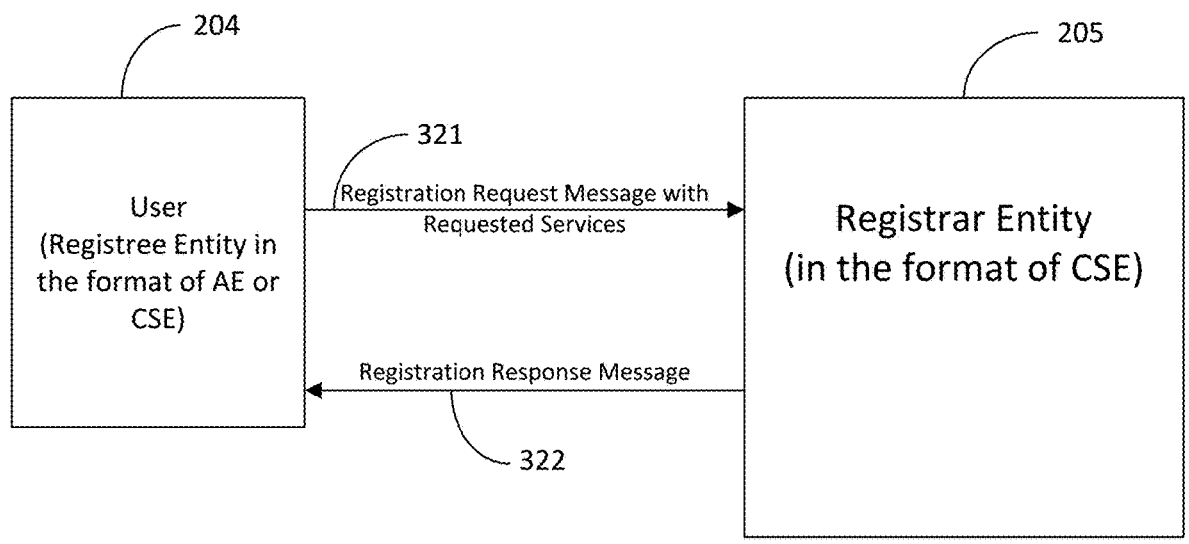
FIG. 20 illustrates an exemplary architecture for a user interface based on flexible service layer registration.

FIG. 20 illustrates an exemplary graphical user interface that may be used for the methods, devices, and systems herein. A user interface can be added to user terminal as registree entity 204 (e.g., in the format of AE or CSE) to display and configure information related to registration, such as services that will be included in the registration message 321 or granted services from registrar entity 205, rejected services from registrar entity 205, or pending services from registrar entity 205, such as message 322. A user interface can also be added to registrar entity 205 (e.g., in the format of CSE) to display information related to registree entities, such as all registree entities registered to the registrar entity granted services to each registree entity, rejected services to each registree entity, or pending services for each registree entity, among other things. At registrar entity 205, it may decide whether to grant permission of the requested services and accept registration.

Figure 21:
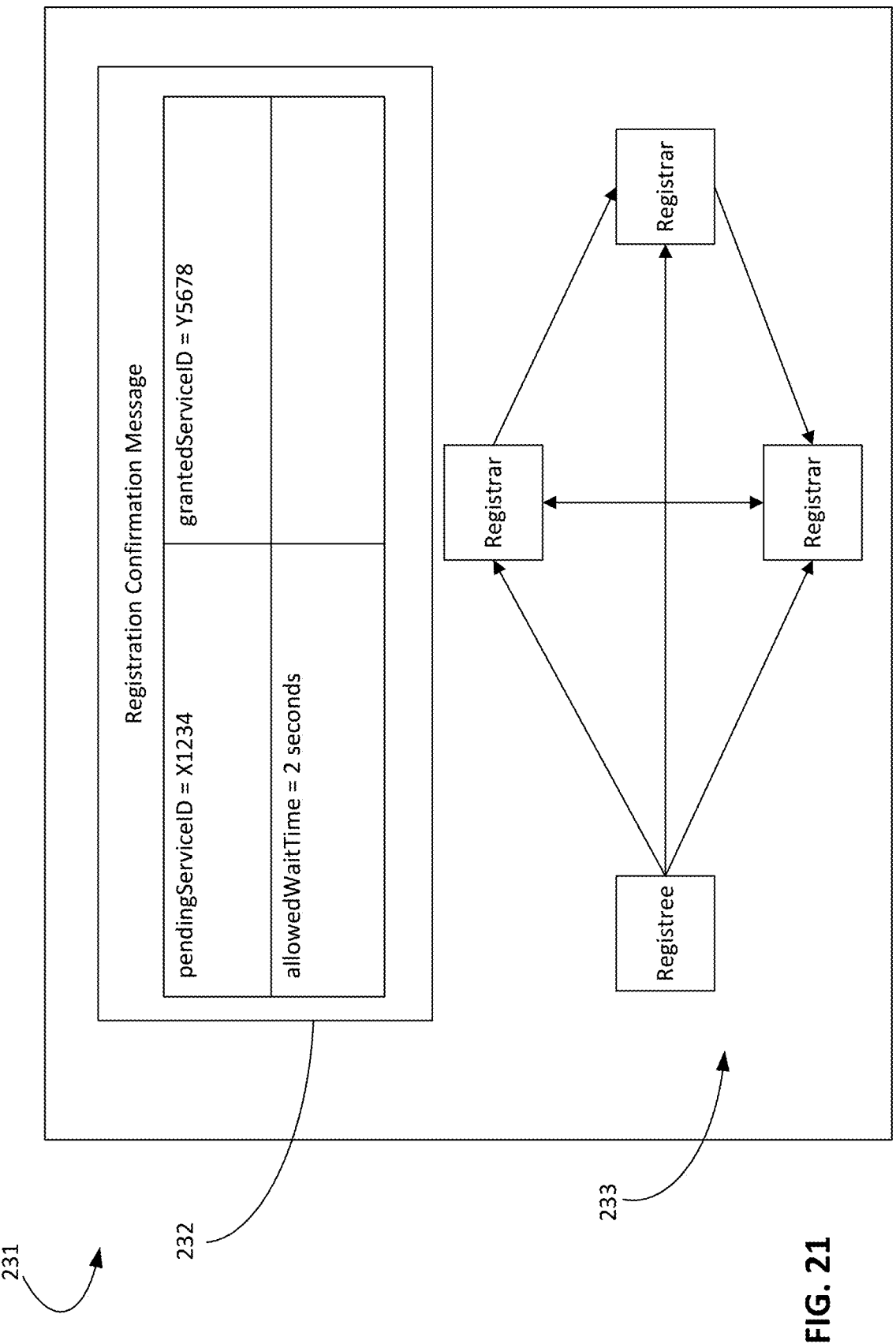
FIG. 21 illustrates an exemplary display that may be generated based on flexible service layer registration.

FIG. 21 illustrates an exemplary display that may be generated based on the methods and systems discussed herein. Display interface 231 (e.g., touch screen display) may provide text in block 232 associated with service layer registration, such as the parameters of Table 1 through Table 15. In another example, progress of any of the steps (e.g., sent messages or success of steps) discussed herein may be displayed in block 232. In addition, graphical output 233 may be displayed on display interface 231. Graphical output 233 may be the topology of the devices with multiple service layer registrations, a graphical output of the progress of any method or systems discussed herein, or the like.

FIG. 22A is a diagram of an example machine-to machine (M2M), Internet of Things (IoT), or Web of Things (WoT) communication system 10 in which one or more disclosed concepts associated with flexible service layer registration may be implemented (e.g., FIG. 6-FIG. 21 and associated discussion). Generally, M2M technologies provide building blocks for the IoT/WoT, and any M2M device, M2M gateway or M2M service platform may be a component of the IoT/WoT as well as an IoT/WoT service layer, etc.

As shown in FIG. 22A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 22A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 22B, the illustrated M2M service layer 22 (E.g., registrar entity 205) in the field domain provides services for the M2M application 20 (e.g., user 204), M2M gateway devices 14, and M2M terminal devices 18 and the communication network 12. Registrar CSE 124, for example, may be considered to be at the M2M service layer 22 in FIG. 22B. Registree AE 123, for example, is often a CSE at the Service Layer 22 or an AE at the Application Layer 20 in FIG. 22B. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 22B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using flexible service layer registration, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The flexible service layer registration of the present application may be implemented as part of a service layer. The service layer is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain the flexible service layer registration of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). Further, the flexible service layer registration of the present application can be implemented as part of an M2M network that uses a Service Oriented Architecture (SOA) and/or a resource-oriented architecture (ROA) to access services such as the flexible service layer registration of the present application.

As discussed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications r various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (i.e., functional interfaces between such functional entities) in order for them to use such capabilities or functionalities.

FIG. 22C is a system diagram of an example M2M device 30, such as an M2M terminal device 18 (which may include registree entity 204) or an M2M gateway device 14 (which may include registrar entity 205) for example. As shown in FIG. 22C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., phone 161, Wi-Fi access point 163, LTE eNB 162, data server 164, registree entity 101, registrar entity 102, originator 201, receiver 202, and others) may be an exemplary implementation that performs the disclosed systems and methods for flexible service layer registration.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 22C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, the transmit/receive element 36 may be an antenna configured to transmit and/or receive RF signals. The transmit/receive element 36 may support various networks and air interfaces, such as WLAN, WPAN, cellular, and the like. In an example, the transmit/receive element 36 may be an emitter/detector configured to transmit and/or receive IR, UV, or visible light signals, for example. In yet another example, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 22C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the flexible service layer registration in some of the examples described herein are successful or unsuccessful (e.g., pending service ID, granted service ID, etc.), or otherwise indicate a status of flexible service layer registration and associated components. The control lighting patterns, images, or colors on the display or indicators 42 may be reflective of the status of any of the method flows or components in the FIG.'S illustrated or discussed herein (e.g., FIG. 6 through FIG. 21, etc.). Disclosed herein are messages and procedures of flexible service layer registration. The messages and procedures can be extended to provide interface/API for users to request flexible service layer registration resources via an input source (e.g., speaker/microphone 38, keypad 40, or display/touchpad 42) and request, configure, or query resources of flexible service layer registration, among other things that may be displayed on display 42.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software or hardware modules that provide additional features, functionality or wired or wireless connectivity. For example, the peripherals 52 may include various sensors such as an accelerometer, biometrics (e.g., figure print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

FIG. ZZD is a block diagram of an exemplary computing system 90 on which, for example, the M2M service platform 22 of FIG. ZZA and FIG. ZZB may be implemented. Computing system 90 (e.g., M2M terminal device 18 or M2M gateway device 14) may comprise a computer or server and may be controlled primarily by computer readable instructions by whatever means such instructions are stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 or coprocessor 81 may receive, generate, and process data related to the disclosed systems and methods for flexible service layer registration, such as registration request with service requirement.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot be easily modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 22A and FIG. 22B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure—flexible service layer registration—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for flexible service layer registration as discussed herein. A method, system, computer readable storage medium, or apparatus has means for sending, by a first application of the device, a first message comprising a registration request for a first service of a service layer to a first registrar entity; receiving a second message that is responsive to the first message, the second message comprising a first list of one or more identifiers of one or more services granted by the first registrar entity for the first application; responsive to the second message, sending a third message that confirms registration with the first registrar entity for the first list of one or more identifiers of one or more services granted; sending, by the first application, a fourth message comprising a registration request for a second service of the service layer to a second registrar entity; receiving a fifth message that is responsive to the fourth message, the fifth message comprising a second list of one or more identifiers of one or more services granted by the second registrar entity for the first application; and responsive to the fifth message, sending a sixth message that confirms registration with the second registrar entity for the second list of one or more identifiers of one or more services granted, wherein the first application is simultaneously registered with the first registrar entity and the second registrar entity. The second message may comprise a valid time, wherein the valid time indicates an effective time period of the first service. The second message may comprise a maximum usage, wherein the maximum usage indicates a maximum number of uses of the first service for the first application. The second message may comprise mutuality, wherein the mutuality indicates whether the first service is bi-directional or unidirectional. The second message further comprises a recommendation registrar, wherein the recommendation registrar indicates a third registrar entity that the first registrar entity recommends for a third service that was rejected, the third service requested in the first message. The second message may comprise an allowed wait time, wherein the allowed wait time indicates a time the device is willing to wait for a pending service to be granted. The second message further comprises a priority order, wherein the priority order indicates a priority of the device. The method, system, computer readable storage medium, or apparatus has means for displaying a graphic on the display based on the second message. The graphic may comprise text associated with a valid time, a maximum usage, mutuality, or a recommendation registrar. All combinations in this paragraph (including the removal or addition of steps) are contemplated in a manner that is consistent with the other portions of the detailed description.

What is claimed:

1. A system associated with registration, the system comprising:
one or more processors; and
memory coupled with the one or more processors, the memory storing executable instructions that when executed by the one or more processors cause the one or more processors to effectuate operations comprising:
receiving, at a first registrar entity, a first message comprising a registration request for a first service of a service layer from a first application of a device, wherein the service layer providing service capabilities accessible to different machine-to-machine applications or systems via an open interface;
sending, at the first registrar entity, a second message that is responsive to the first message, the second message comprising information indicating a first set of one or more identifiers of one or more services granted by the first registrar entity for the first application;
receiving, at a second registrar entity, a third message comprising a registration request for a second service of the service layer from the first application; and
sending, at the second registrar entity, a fourth message that is responsive to the third message, the fourth message comprising information indicating a second set of one or more identifiers of one or more services granted by the second registrar entity for the first application, wherein the first application is simultaneously registered with the first registrar entity and the second registrar entity.

2. The registrar system of claim 1, wherein the second message further comprises a valid time, wherein the valid time indicates an effective time period of the first service.

3. The registrar system of claim 1, wherein the second message further comprises a maximum usage, wherein the maximum usage indicates a maximum number of uses of the first service for the first application.

4. The registrar system of claim 1, wherein the second message further comprises a mutuality, wherein the mutuality indicates whether the first service is bi-directional or unidirectional.

5. The registrar system of claim 1, wherein the second message further comprises a recommendation registrar, wherein the recommendation registrar indicates a third registrar entity that the first registrar entity recommends for a third service that was rejected, the third service requested in the first message.

6. The registrar system of claim 1, wherein the second message further comprises an allowed wait time, wherein the allowed wait time indicates a time the device is willing to wait for a pending service to be granted.

7. The registrar system of claim 1, wherein the second message further comprises a priority order, wherein the priority order indicates a priority of the device.

8. A method comprising:
sending, by a first application of a device, a first message comprising a registration request for a first service of a service layer to a first registrar entity, the service layer providing service capabilities accessible to different machine-to-machine applications and systems via an open interface;
receiving, by the first application, a second message that is responsive to the first message, the second message comprising information indicating a first set of one or more identifiers of one or more services granted by the first registrar entity for the first application;
sending, by the first application, a third message comprising a registration request for a second service of the service layer to a second registrar entity; and
receiving, by the first application, a fourth message that is responsive to the third message, the fourth message comprising information indicating a second set of one or more identifiers of one or more services granted by the second registrar entity for the first application, wherein the first application is simultaneously registered with the first registrar entity and the second registrar entity.

9. The method of claim 8, wherein the second message further comprises a valid time, wherein the valid time indicates an effective time period of the first service.

10. The method of claim 8, wherein the second message further comprises a maximum usage, wherein the maximum usage indicates a maximum number of uses of the first service for the first application.

11. The method of claim 8, wherein the second message further comprises a mutuality, wherein the mutuality indicates whether the first service is bi-directional or unidirectional.

12. The method of claim 8, wherein the second message further comprises a recommendation registrar, wherein the recommendation registrar indicates a third registrar entity that the first registrar entity recommends for a third service that was rejected, the third service requested in the first message.

13. The method of claim 8, wherein the second message further comprises an allowed wait time, wherein the allowed wait time indicates a time the device is willing to wait for a pending service to be granted.

14. The method of claim 8, wherein the second message further comprises a priority order, wherein the priority order indicates a priority of the device.

15. A computer readable storage medium storing computer executable instructions that when executed by a computing device cause said computing device to effectuate operations comprising:
receiving, at a first registrar entity, a first message comprising a registration request for a first service of a service layer from a first application of a device, the service layer providing service capabilities accessible to different machine-to-machine applications or systems via an open interface;
sending, at the first registrar entity, a second message that is responsive to the first message, the second message comprising information indicating a first set of one or more identifiers of one or more services granted by the first registrar entity for the first application;
receiving, at a second registrar entity, a third message comprising a registration request for a second service of the service layer from the first application; and
sending, at the second registrar entity, a fourth message that is responsive to the third message, the fourth message comprising information indicating a second set of one or more identifiers of one or more services granted by the second registrar entity for the first application, wherein the first application is simultaneously registered with the first registrar entity and the second registrar entity.

16. The computer readable storage medium of claim 15, wherein the second message further comprises a valid time, wherein the valid time indicates an effective time period of the first service.

17. The computer readable storage medium of claim 15, wherein the second message further comprises a maximum usage, wherein the maximum usage indicates a maximum number of uses of the first service for the first application.

18. The computer readable storage medium of claim 15, wherein the second message further comprises a mutuality, wherein the mutuality indicates whether the first service is bi-directional or unidirectional.

19. The computer readable storage medium of claim 15, wherein the second message further comprises a recommendation registrar, wherein the recommendation registrar indicates a third registrar entity that the first registrar entity recommends for a third service that was rejected, the third service requested in the first message.

20. The computer readable storage medium of claim 15, the operations further comprising displaying a graphic that comprises text associated with a valid time, a maximum usage, a mutuality, or a recommendation registrar.

* * * * *